(12) United States Patent
Uekita

(10) Patent No.: US 11,499,819 B2
(45) Date of Patent: Nov. 15, 2022

(54) SHAPE MEASUREMENT METHOD AND SHAPE MEASURING DEVICE

(71) Applicant: KABUSHIKI KAISHA TOSHIBA, Tokyo (JP)

(72) Inventor: Masahiro Uekita, Yokohama (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 83 days.

(21) Appl. No.: 16/953,982

(22) Filed: Nov. 20, 2020

(65) Prior Publication Data

US 2021/0285758 A1 Sep. 16, 2021

(30) Foreign Application Priority Data

Mar. 16, 2020 (JP) .............................. JP2020-045547

(51) Int. Cl.
  *G01B 11/24* (2006.01)
  *G01B 11/04* (2006.01)

(52) U.S. Cl.
  CPC .............. *G01B 11/24* (2013.01); *G01B 11/04* (2013.01)

(58) Field of Classification Search
  None
  See application file for complete search history.

(56) References Cited

U.S. PATENT DOCUMENTS

| 4,557,599 | A | * | 12/1985 | Zimring | ................... | G01B 3/02 |
| | | | | | | 356/243.1 |
| 5,469,360 | A | * | 11/1995 | Ihara | ...................... | G01C 21/30 |
| | | | | | | 340/995.25 |
| 5,485,082 | A | | 1/1996 | Wisspeintner et al. | | |
| 5,699,161 | A | * | 12/1997 | Woodworth | ........... | G01B 11/00 |
| | | | | | | 356/628 |
| 8,825,427 | B2 | * | 9/2014 | Kunzmann | .......... | G01B 21/042 |
| | | | | | | 702/85 |
| 10,234,274 | B2 | | 3/2019 | Fuellmeier et al. | | |
| 2005/0154548 | A1 | * | 7/2005 | Basel | ........................ | G01S 5/16 |
| | | | | | | 702/94 |

(Continued)

FOREIGN PATENT DOCUMENTS

| EP | 2 144 035 A1 | 1/2010 |
| JP | 2003-130640 A | 5/2003 |

(Continued)

*Primary Examiner* — Michael A Lyons
*Assistant Examiner* — Jarreas C Underwood
(74) *Attorney, Agent, or Firm* — Maier & Maier, PLLC

(57) ABSTRACT

A shape measurement method includes: acquiring first data of a change of a distance between a first probe and a calibration measurement object and acquiring second data of a change of a distance between a second probe and the calibration measurement object while moving the calibration measurement object in a first direction, the calibration measurement object being rotationally symmetric around an axis parallel to the first direction, the first probe and the second probe being arranged in a second direction orthogonal to the first direction; estimating an error of the movement included in the first data based on the first and second data; acquiring third data of a change of a distance between the first probe and a measurement object while moving the measurement object relative to the first probe in the first direction; and correcting the third data by using the error.

7 Claims, 35 Drawing Sheets

(56) References Cited

U.S. PATENT DOCUMENTS

| | | | |
|---|---|---|---|
| 2006/0221348 A1* | 10/2006 | Deck | G01B 9/02072 |
| | | | 356/511 |
| 2009/0090013 A1* | 4/2009 | Hicks | G01B 21/045 |
| | | | 33/502 |
| 2009/0100900 A1* | 4/2009 | Spalding | G01B 11/2504 |
| | | | 73/1.81 |
| 2009/0228169 A1* | 9/2009 | Chiorean | G01B 21/042 |
| | | | 455/41.2 |
| 2009/0326849 A1* | 12/2009 | MacManus | G01B 21/042 |
| | | | 33/502 |
| 2012/0006215 A1* | 1/2012 | DeJong | G03G 15/1615 |
| | | | 101/481 |
| 2012/0188558 A1* | 7/2012 | Yamagata | G01B 3/30 |
| | | | 356/601 |
| 2013/0192071 A1* | 8/2013 | Esposito | A43B 17/00 |
| | | | 324/693 |
| 2017/0284788 A1 | 10/2017 | Kannaka et al. | |
| 2019/0011327 A1* | 1/2019 | Phommasith | G01B 21/04 |
| 2019/0375066 A1 | 12/2019 | Suzuki et al. | |
| 2021/0225607 A1* | 7/2021 | Chen | G01B 21/042 |

FOREIGN PATENT DOCUMENTS

| | | |
|---|---|---|
| JP | 2007-147331 A | 6/2007 |
| JP | 2009-267054 A | 11/2009 |
| JP | 6232512 B1 | 11/2017 |
| JP | 2018-87749 A | 6/2018 |
| WO | WO 2016/047274 A1 | 3/2016 |

* cited by examiner

SHAPE MEASUREMENT METHOD AND SHAPE MEASURING DEVICE

CROSS-REFERENCE TO RELATED APPLICATIONS

This application is based upon and claims the benefit of priority from the prior Japanese Patent Application No. 2020-045547, filed on Mar. 16, 2020; the entire contents of which are incorporated herein by reference.

FIELD

Embodiments relate to a shape measurement method and a shape measuring device.

BACKGROUND

In a conventionally known method, the change of a distance between a probe and a measurement object is measured while moving the measurement object with respect to the probe in a first direction in a state in which the measurement object and the probe face each other, and the surface shape of the measurement object along the first direction is estimated from the measured change of the distance. However, when moving the measurement object with respect to the probe in the first direction, there are cases where the measurement object also slightly moves in a direction crossing the first direction, i.e., a second direction in which the measurement object and the probe face each other. In such a case, the measured change of the distance includes an error of the movement of the measurement object.

DETAILED DESCRIPTION

Figure 1:
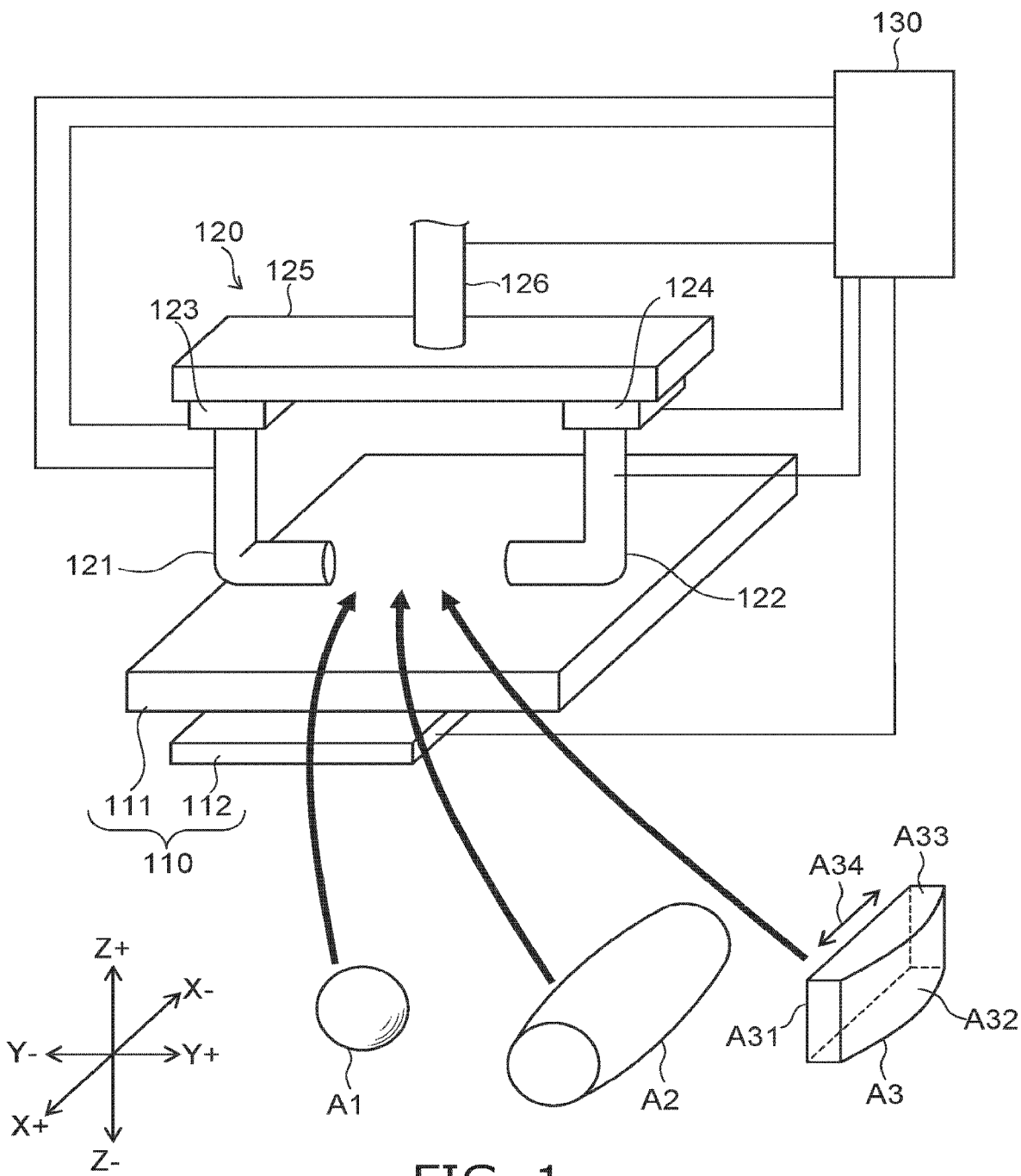
FIG. 1 is a perspective view showing a shape measuring device according to a first embodiment.

In general, according to one embodiment, a shape measurement method includes: acquiring first data of a change of a distance between a first probe and a calibration measurement object and acquiring second data of a change of a distance between a second probe and the calibration measurement object while moving the calibration measurement object relative to the first and second probes in a first direction between the first probe and the second probe, the calibration measurement object being rotationally symmetric around an axis parallel to the first direction, the first probe and the second probe being arranged in a second direction orthogonal to the first direction; estimating an error of the movement included in the first data based on the first and second data; acquiring third data of a change of a distance between the first probe and a measurement object while moving the measurement object relative to the first probe in the first direction; and correcting the third data by using the error.

In general, according to one embodiment, a shape measurement method includes: acquiring first data of a change of a distance between a probe and a calibration measurement object while moving the calibration measurement object relative to the probe in a first direction, the calibration measurement object being rotationally symmetric around an axis parallel to the first direction, the probe being located at a first position; moving the probe to a second position at a side opposite to the first position, the calibration measurement object being interposed between the first position and the second position; acquiring second data of a change of a distance between the probe and the calibration measurement object while moving the calibration measurement object relative to the probe in the first direction; estimating an error of the movement included in the first data based on the first and second data; acquiring third data of a change of a distance between the probe and a measurement object while moving the measurement object relative to the probe in the first direction; and correcting the third data by using the error.

In general, according to one embodiment, a shape measuring device includes: a calibration measurement object rotationally symmetric around an axis parallel to a first direction; a first probe and a second probe arranged in a second direction orthogonal to the first direction; a movement mechanism configured to move the calibration measurement object relative to the first and second probes in the first direction and configured to move a measurement object relative to the first and second probes in the first direction; and a controller controlling the first probe, the second probe, and the movement mechanism. The controller acquires first data of a change of a distance between the first probe and the calibration measurement object and acquires second data of a change of a distance between the second probe and the calibration measurement object while moving the calibration measurement object relative to the first and second probes in the first direction by controlling the first probe, the second probe, and the movement mechanism in a state in which the calibration measurement object is between the first probe and the second probe. The controller estimates an error of the movement included in the first data based on the first and second data. The controller acquires third data of a change of a distance between the first probe and the measurement object while moving the measurement object relative to the first probe in the first direction by controlling the first probe and the movement mechanism in a state in which the measurement object is between the first probe and the second probe. The controller corrects the third data by using the error.

First Embodiment

First, a first embodiment will be described.

In the following description, the drawings are schematic and conceptual; and the relationships between the thickness and width of portions, the proportions of sizes among portions, etc., are not necessarily the same as the actual values. The dimensions and proportions may be illustrated differently among drawings, even for identical portions.

Shape Measuring Device

FIG. 1 is a perspective view showing a shape measuring device according to the embodiment.

Generally speaking, the shape measuring device 100 according to the embodiment includes a movement unit 110, a measurement unit 120, and a controller 130.

The components of the shape measuring device 100 will now be elaborated. An orthogonal coordinate system is used in the description hereinbelow. Hereinbelow, the direction from a stage 111 of the movement unit 110 toward a first probe 121 and a second probe 122 of the measurement unit 120 also is called the "upward direction". The upward direction also is called a "+Z direction", and the reverse direction of the upward direction is called a "−Z direction". One direction that is orthogonal to the +Z direction is called a "+X direction", and the reverse direction of the "+X direction" is called a "−X direction". One direction that is orthogonal to the −Z direction and the +X direction is called a "+Y direction", and the reverse direction of the "+Y direction" is called a "−Y direction". In the embodiment, +X direction corresponds to a first direction, the +Y direction corresponds to a second direction, and the +Z direction corresponds to a third direction.

The movement unit 110 includes the stage 111 and a movement mechanism 112. The upper surface of the stage 111 is parallel to the +X direction and the +Y direction. For example, the movement mechanism 112 can include a ball screw mechanism, etc. The movement mechanism 112 is configured to move the stage 111 in the +X direction and the −X direction.

In the embodiment, examples of objects that are placed on the stage 111 include a reference body A1 and a calibration measurement object A2 that are used to estimate the error of the movement of the stage 111, and a measurement object A3 of which the surface shape is to be actually measured. The details of the reference body A1 and the calibration measurement object A2 are described below.

In the embodiment, the measurement object A3 is a long optical component. Examples of the long optical component include, for example, a lens that is used to write to a photosensitive drum of a multifunction peripheral (MFP), etc.

In the embodiment, the surfaces of the measurement object A3 include a first surface A31, a second surface A32, and a third surface A33. The first surface A31 is, for example, a substantially flat surface. The first surface A31 extends along a longitudinal direction A34 of the measurement object A3. The second surface A32 is positioned at the side opposite to the first surface A31. The second surface A32 is a curved surface that is convex away from the first surface A31. The third surface A33 is between the first surface A31 and the second surface A32. The dimension along the longitudinal direction A34 of the measurement object A3 is, for example, 300 mm. However, the configuration of the measurement object A3 is not limited to that described above. For example, the measurement object A3 may not be long and may not be an optical component.

The measurement unit 120 includes the first probe 121, the second probe 122, a first moving part 123, a second moving part 124, a holder 125, and a third moving part 126. The measurement unit 120 is located above the stage 111.

In the embodiment, each of the probes 121 and 122 is configured to measure the distance from the object placed on the stage 111 without contact. Examples of such probes include, for example, an optical probe such as a chromatic confocal probe, a laser focus probe, etc.

In the embodiment, the first probe 121 is mounted to the first moving part 123 to face the +Y direction. The first moving part 123 includes, for example, an actuator such as a motor, etc. In the embodiment, the first moving part 123 is configured to move the first probe 121 in the +X direction, the −X direction, the +Y direction, the −Y direction, the +Z direction, and the −Z direction. The first moving part 123 may be configured to rotate the first probe 121 around an axis parallel to the +Z direction.

In the embodiment, the second probe 122 is mounted to the second moving part 124 to face the −Y direction. The second moving part 124 includes, for example, an actuator such as a motor, etc. The position in the +Y direction of the second moving part 124 is different from the position in the +Y direction of the first moving part 123. In the embodiment, the second moving part 124 is configured to move the second probe 122 in the +X direction, the −X direction, the +Y direction, the −Y direction, the +Z direction, and the −Z direction. The second moving part 124 may be configured to rotate the second probe 122 around an axis parallel to the +Z direction.

The holder 125 holds the first moving part 123 and the second moving part 124. The holder 125 is mounted to the third moving part 126. The third moving part 126 includes, for example, an actuator such as a motor, etc. The third moving part 126 is configured to move the holder 125 in the +Z direction and the −Z direction.

The controller 130 is, for example, a computer including a CPU (Central Processing Unit), memory, etc. The controller 130 controls the movement mechanism 112, the first probe 121, the second probe 122, the first moving part 123, the second moving part 124, and the third moving part 126.

Figure 2:
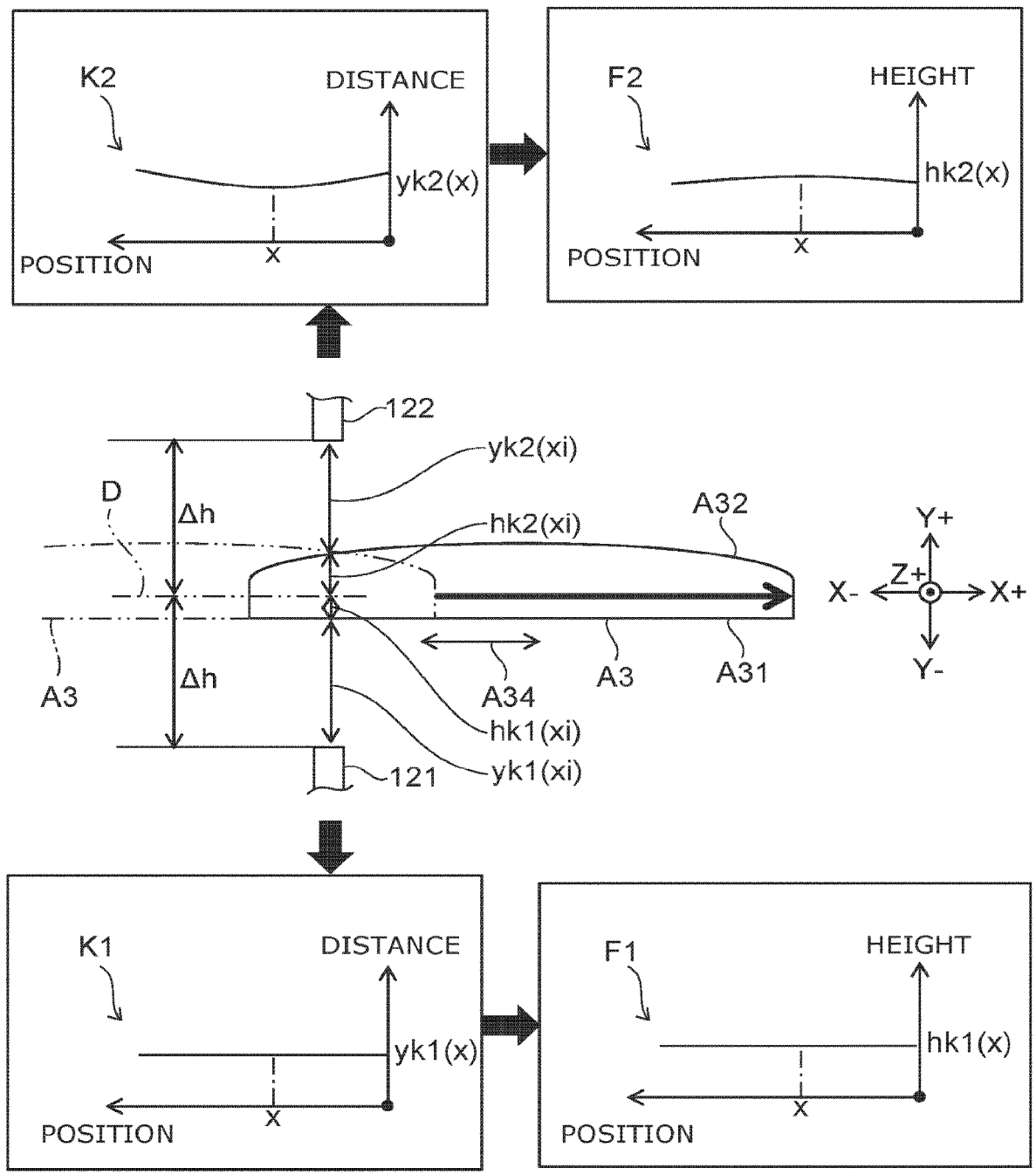
FIG. 2 is a conceptual view showing a shape measurement method in an ideal case in which a first probe and a second probe have no measurement error and a stage moves straight along the +X direction.

FIG. 2 is a conceptual view showing a shape measurement method in an ideal case in which the first probe and the second probe have no measurement error and the stage moves straight along the +X direction.

When the surface shapes along the longitudinal direction A34 of the first and second surfaces A31 and A32 of the measurement object A3 are to be measured, the measurement object A3 is placed on the stage 111 so that the longitudinal direction A34 is parallel to the +X direction. Then, the controller 130 controls the movement mechanism 112, the first probe 121, and the second probe 122 and acquires data K1 of the change of the distance between the first surface A31 and the first probe 121 and acquires data K2 of the change of the distance between the second surface A32 and the second probe 122 while moving the measurement object A3 in the +X direction.

The data K1 is shown in a graph of FIG. 2 in which the horizontal axis is the position in the +X direction of the stage 111, and the vertical axis is the distance. The data K1 is data in which a measured value yk1($x$) of the distance between the first surface A31 and the first probe 121 measured by the first probe 121 at each position ($x$) is associated with the multiple positions ($x$) in the +X direction of the stage 111. In the data K1, the multiple positions ($x$) in the +X direction of the stage 111 correspond to the multiple positions ($x$) in the +X direction of the first surface A31.

Similarly, the data K2 is shown in a graph of FIG. 2 in which the horizontal axis is the position in the +X direction of the stage 111, and the vertical axis is the distance. The data K2 is data in which a measured value yk2($x$) of the distance between the second surface A32 and the second probe 122 measured by the second probe 122 at each position ($x$) is associated with the multiple positions ($x$) in the +X direction of the stage 111. In the data K2, the multiple positions ($x$) in the +X direction of the stage 111 correspond to the multiple positions ($x$) in the +X direction of the second surface A32.

If the first probe 121 has no measurement error ep1 and the stage 111 moves straight along the +X direction according to a control signal from the controller 130, the measured value yk1($x$) of the data K1 corresponds to the distance between the first probe 121 and the first surface A31 when the stage 111 is positioned at some position ($x$) in the +X direction. Accordingly, the surface shape of the first surface A31 can be calculated as follows.

The controller 130 calculates a value hk1($xi$) by subtracting the measured value yk1($xi$) at some position ($xi$) in the +X direction of the data K1 from a distance Δh between the first probe 121 and a reference surface D, which is parallel to the +X direction and the +Z direction. The value hk1($xi$) corresponds to the height of the first surface A31 from the reference surface D at the position ($xi$) in the +X direction. The controller 130 performs this processing for all positions ($x$) in the +X direction of the data K1. Thereby, data F1 is generated in which the height hk1($x$) from the reference surface D at each position ($x$) is associated with the multiple positions ($x$) in the +X direction of the first surface A31. In the data F1, the change of the height hk1($x$) in the +X direction corresponds to the surface shape along the +X direction of the first surface A31.

Similarly, if the second probe 122 has no measurement error ep2 and the stage 111 moves straight along the +X direction according to the control signal from the controller 130, the measured value yk2($x$) of the data K2 corresponds to the distance between the second probe 122 and the second surface A32 when the stage 111 is positioned at some position ($x$) in the +X direction. Accordingly, the surface shape of the second surface A32 can be calculated as follows.

The controller 130 calculates a value hk2($xi$) by subtracting the measured value yk2($xi$) at some position ($xi$) in the +X direction of the data K2 from the distance Δh between the second probe 122 and the reference surface D, which is parallel to the +X direction and the +Y direction. The value hk2($xi$) corresponds to the height of the second surface A32 from the reference surface D at the position ($xi$) in the +X direction. The controller 130 performs this processing for all positions ($x$) in the +X direction of the data K2. Thereby, data F2 is generated in which the height hk2(x) from the reference surface D at each position (x) is associated with the multiple positions (x) in the +X direction of the second surface A32. In the data F2, the change of the height hk2(x) in the +X direction corresponds to the surface shape along the +X direction of the second surface A32.

Figure 3:
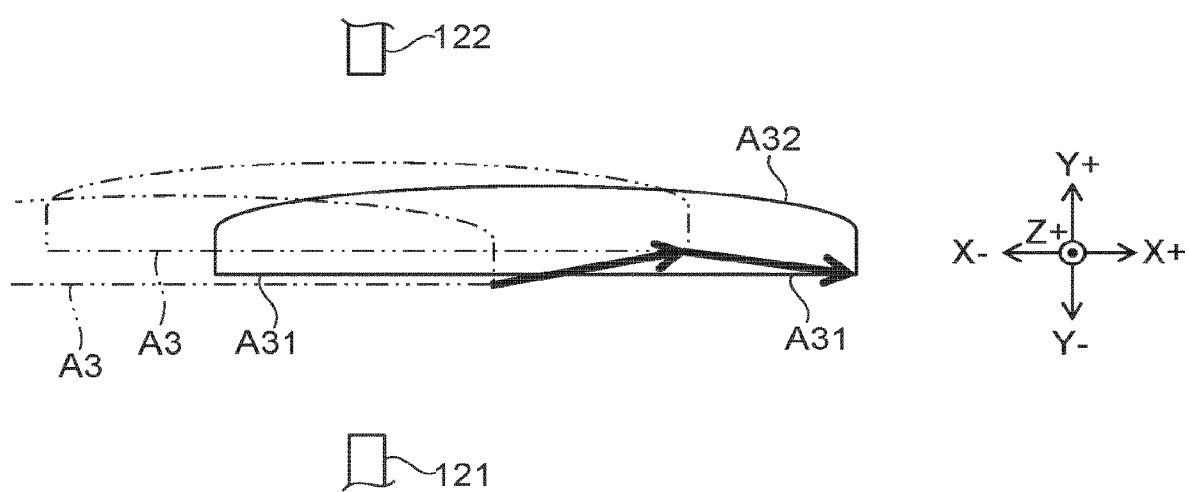
FIG. 3 is a top view illustrating a trajectory of a measurement object.

FIG. 3 is a top view illustrating a trajectory of the measurement object.

However, even when the controller 130 transmits a control signal to the movement mechanism 112 that instructs the movement mechanism 112 to move the stage 111 straight along the +X direction, actually, as illustrated in FIG. 3, the stage 111 moves not only in the +X direction but also slightly in the +Y direction or the −Y direction. Therefore, the measurement object A3 that is placed on the stage 111 also moves not only in the +X direction but also slightly in the +Y direction or the −Y direction. Accordingly, the error of the movement of the stage 111 is included in the measured value yk1(x) at each position (x) in the +X direction of the data K1 and the measured value yk2(x) at each position (x) in the +X direction of the data K2.

The shape measurement method according to the embodiment includes a calibration method of estimating the error of the movement of the stage 111 by using the reference body A1 and the calibration measurement object A2, and a method for estimating the surface shape of the measurement object A3 by using the estimated error. The calibration method and the method for estimating the surface shape of the measurement object A3 will now be described.

Calibration Method

First, the calibration method of the shape measurement method according to the embodiment will be described.

Figure 4:
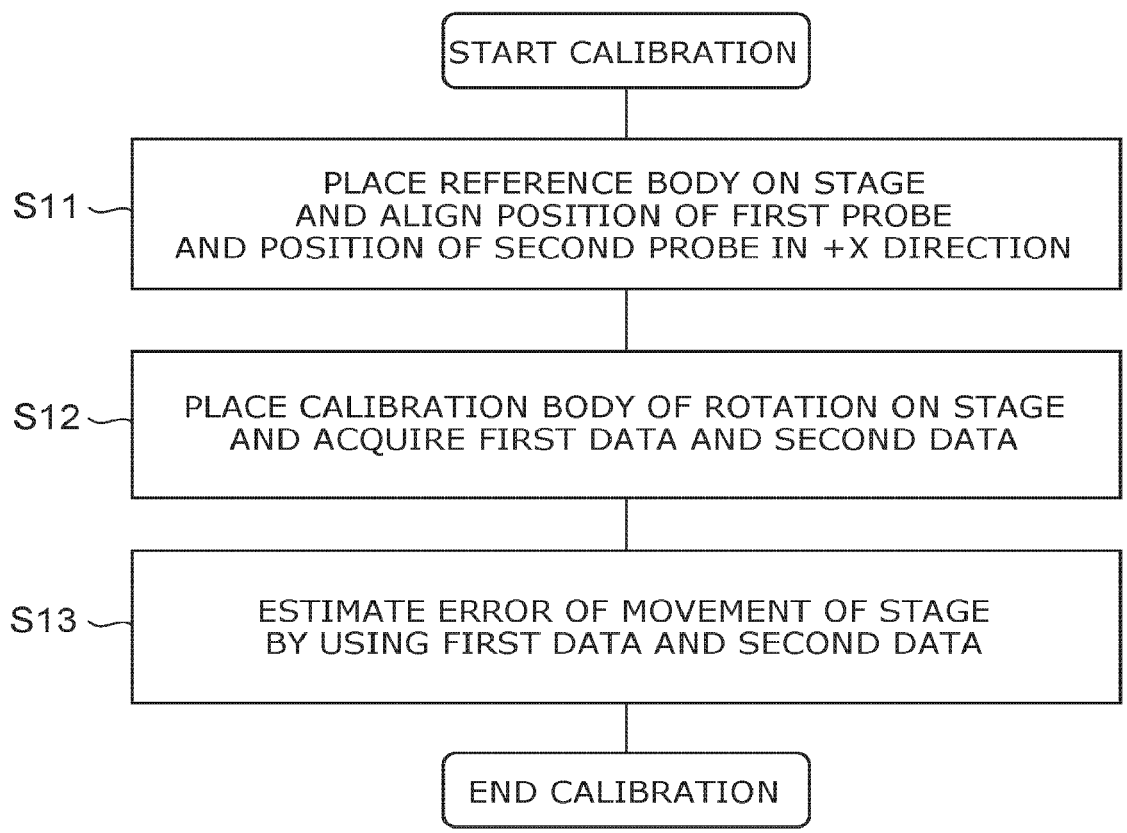
FIG. 4 is a flowchart showing a calibration method of a shape measurement method according to the first embodiment.

FIG. 4 is a flowchart showing the calibration method of the shape measurement method according to the embodiment.

Generally speaking, as shown in FIG. 4, the shape measurement method according to the embodiment includes a process (S11) of placing the reference body A1 on the stage 111 and aligning the position of the first probe 121 and the position of the second probe 122 in the +X direction, a process (S12) of placing the calibration measurement object A2 on the stage 111 and acquiring first data D1 and second data D2, and a process (S13) of estimating the error of the movement of the stage 111 by using the first data D1 and the second data D2. The processes will now be elaborated.

First, the process (S11) of placing the reference body A1 on the stage 111 and aligning the position of the first probe 121 and the position of the second probe 122 in the +X direction will be described.

Figure 5:
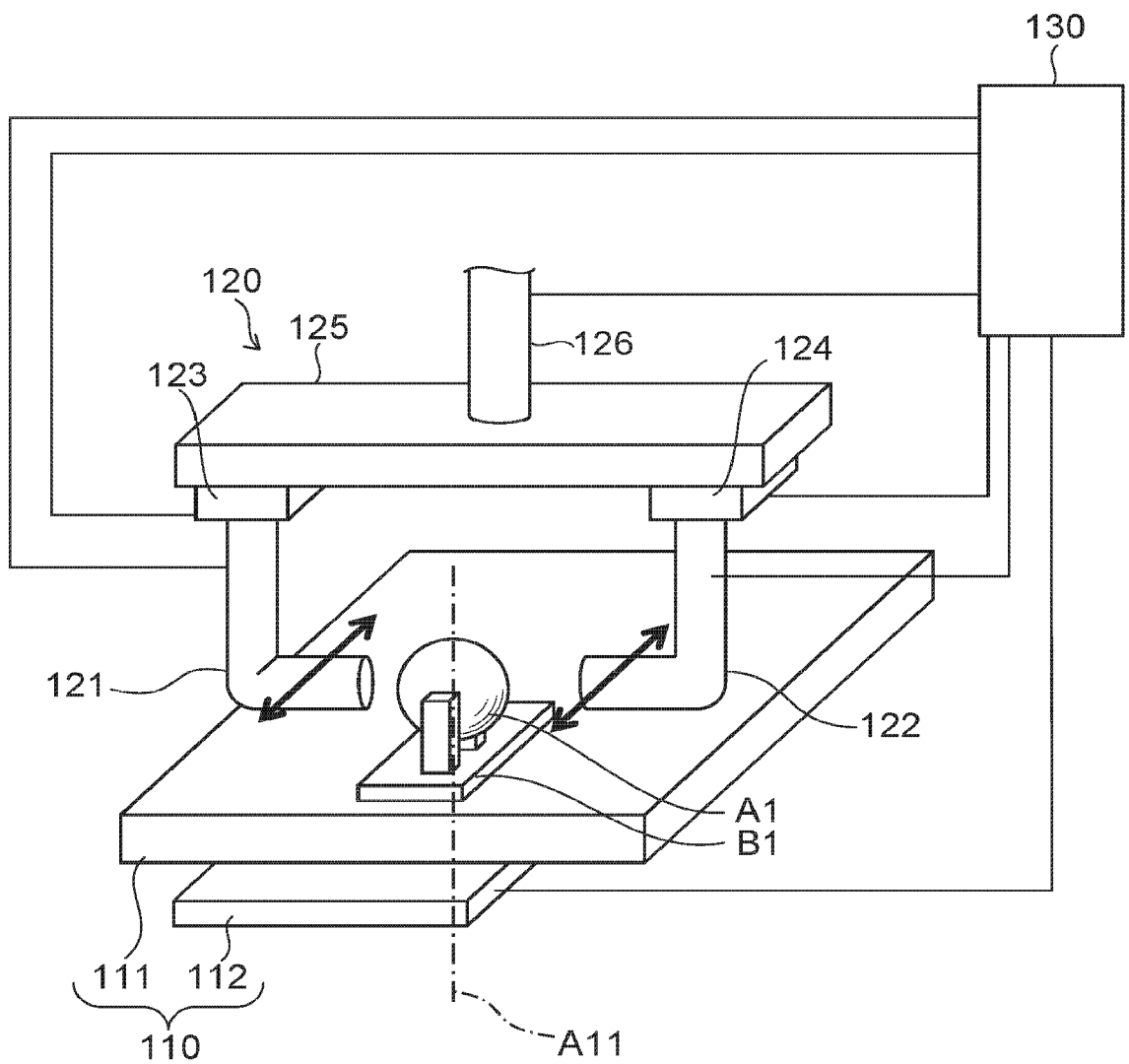
FIG. 5 is a perspective view showing a method of aligning positions of two probes in the calibration method.

FIG. 5 is a perspective view showing the method of aligning the positions of the two probes in the calibration method.

Figure 6A:
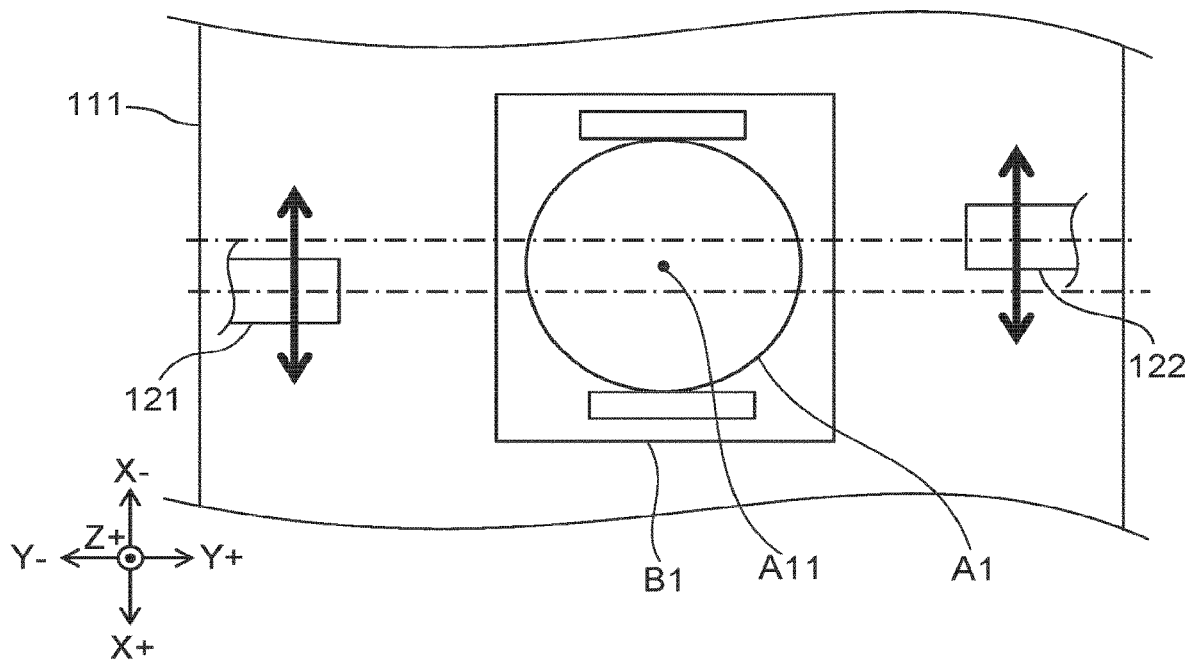
FIG. 6A is a top view showing a state before aligning positions in +X direction of the two probes.
Figure 6B:
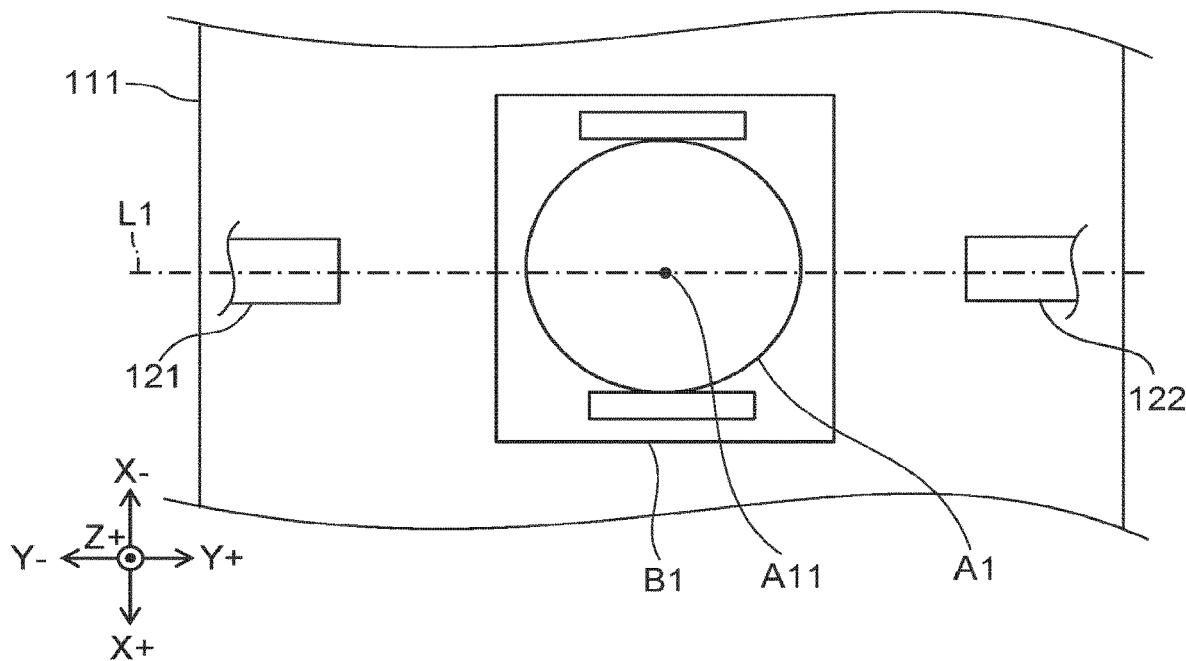
FIG. 6B is a top view showing the state after aligning the positions in the +X direction of the two probes.

FIG. 6A is a top view showing the state before aligning the positions in the +X direction of the two probes, and FIG. 6B is a top view showing the state after aligning the positions in the +X direction of the two probes.

As shown in FIG. 6A, there are cases where the position in the +X direction of the first probe 121 and the position in the +X direction of the second probe 122 are different. In the embodiment as shown in FIGS. 5 and 6A, the position in the +X direction of the first probe 121 and the position in the +X direction of the second probe 122 are aligned by using the reference body A1.

The reference body A1 is a body of rotation that is rotationally symmetric around at least one axis A11. In the specification, "rotationally symmetric" does not mean strictly rotationally symmetric; processing precision that is sufficiently greater than the measurement precision necessary when measuring the surface shape of the measurement object A3 is considered to be rotationally symmetric. In the embodiment, the reference body A1 is a sphere that is rotationally symmetric around any axis passing through the center of the reference body A1. However, the reference body may not be spherical and may be rotationally symmetric around only one axis, e.g., circular columnar, circular conic, truncated circular conic, etc.

In a process S11 as shown in FIG. 5, first, the reference body A1 is placed on the stage 111 in a state of being held by a holder B1. In the embodiment, the reference body A1 is spherical; therefore, by simply placing the reference body A1 on the stage 111, all axes A11 that pass through the center are parallel to the +Z direction. When the reference body is not spherical and has a shape that is rotationally symmetric around only one axis, the reference body is placed on the stage 111 so that the axis is parallel to the +Z direction.

Then, as shown in FIGS. 6A and 6B, the controller 130 controls the first moving part 123 and the first probe 121, measures the change of the distance between the first probe 121 and the reference body A1 while moving the first probe 121 with respect to the reference body A1 in the +X direction or the −X direction, and moves the first probe 121 to a position in the +X direction to minimize the distance to the reference body A1. Similarly, the controller 130 controls the second moving part 124 and the second probe 122, measures the change of the distance between the second probe 122 and the reference body A1 while moving the second probe 122 with respect to the reference body A1 in the +X direction or the −X direction, and moves the second probe 122 to a position in the +X direction to minimize the distance to the reference body A1. Here, the "minimized distance" does not always mean that the measured values of the distances by the probes 121 and 122 are strictly minima; the measured values of the distances may be practically minima. For example, when multiple positions in the +X direction that are minima of the measured values exist, the center position in the +X direction of the positions may be used as the position of minimized distance.

The reference body A1 is rotationally symmetric around the axis A11, which is parallel to the +Z direction. Therefore, the distance between the first probe 121 and the reference body A1 and the distance between the second probe 122 and the reference body A1 are minima when positioned on a straight line L1 passing through the axis A11 parallel to the +Y direction when viewed in top-view. Therefore, the position of the first probe 121 in the +X direction and the position of the second probe 122 in the +X direction can be aligned as shown in FIG. 6B by moving the probes 121 and 122 to positions to minimize the distances from the reference body A1.

Figure 7A:
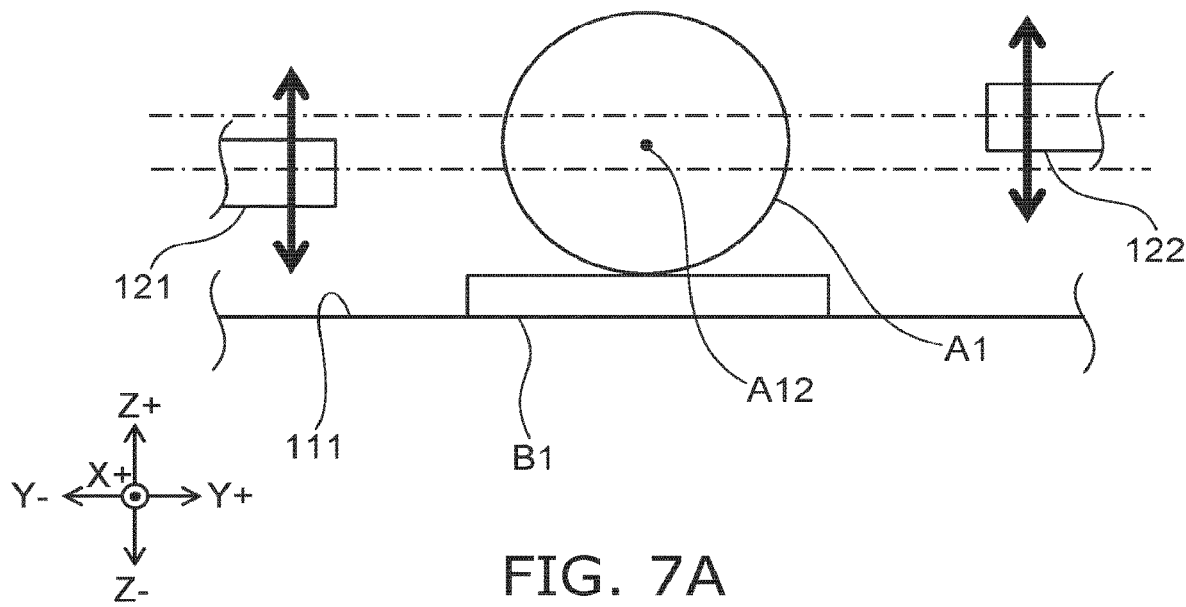
FIG. 7A is a side view showing a state before aligning positions in +Z direction of the two probes.
Figure 7B:
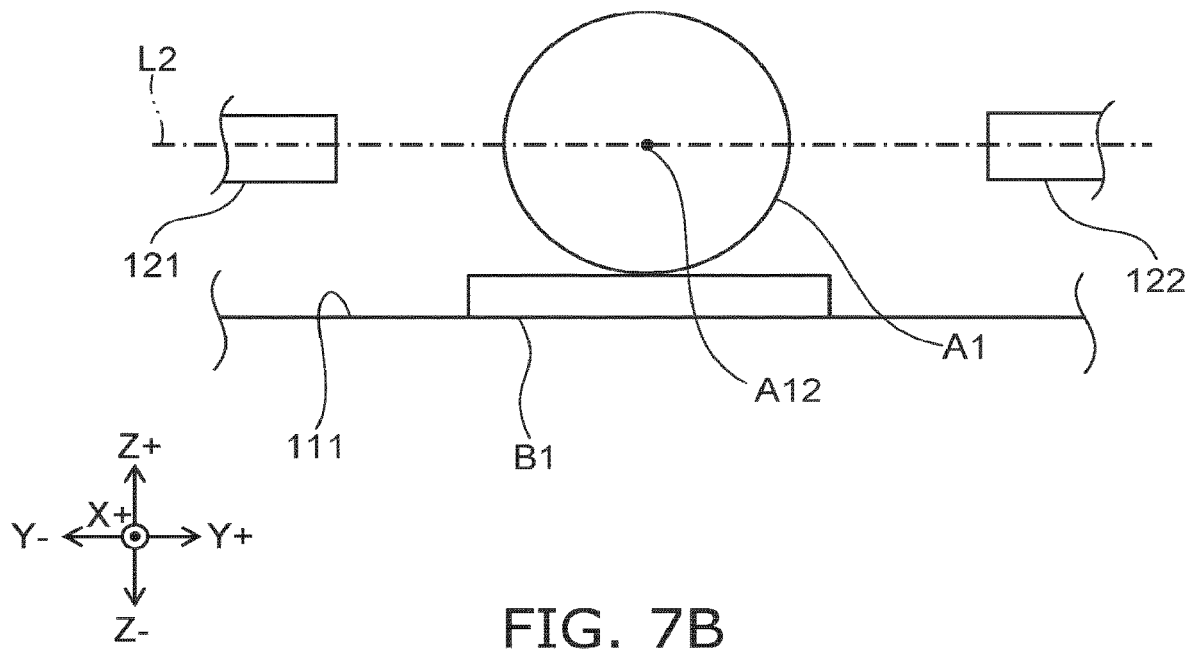
FIG. 7B is a side view showing the state after aligning the positions in the +Z direction of the two probes.

FIG. 7A is a side view showing a state before aligning the positions in the +Z direction of the two probes, and FIG. 7B is a side view showing the state after aligning the positions in the +Z direction of the two probes.

As shown in FIG. 7A, there are cases where the position in the +Z direction of the first probe 121 and the position in the +Z direction of the second probe 122 are different.

The controller 130 controls the first moving part 123 and the first probe 121, measures the change of the distance between the first probe 121 and the reference body A1 while moving the first probe 121 with respect to the reference body A1 in the +Z direction or the −Z direction, and moves the first probe 121 to a position to minimize the distance to the reference body A1 in the +Z direction. Similarly, the controller 130 controls the second moving part 124 and the second probe 122, measures the change of the distance between the second probe 122 and the reference body A1 while moving the second probe 122 with respect to the reference body A1 in the +Z direction or the −Z direction, and moves the second probe 122 to a position to minimize the distance to the reference body A1 in the +Z direction.

In the embodiment, the reference body A1 is spherical; therefore, the reference body A1 is rotationally symmetric also around an axis A12, which is parallel to the +X direction. Therefore, the distance between the first probe 121 and the reference body A1 and the distance between the second probe 122 and the reference body A1 are minima when positioned on a straight line L2 passing through the axis A12 parallel to the +Y direction when viewed in side-view. Therefore, the position of the first probe 121 in the +Z direction and the position of the second probe 122 in the +Z direction can be aligned as shown in FIG. 7B by moving the probes 121 and 122 to positions to minimize the distances from the reference body A1.

If, however, the positions in the +Z direction of the two probes 121 and 122 match, it is unnecessary to align the positions in the +Z direction of the two probes 121 and 122. In such a case, it is sufficient to align only the positions in the +X direction of the two probes 121 and 122. Also, if the positions in the +X direction of the two probes 121 and 122 match, it is unnecessary to align the positions in the +X direction of the two probes 121 and 122. In other words, the process S11 may not be performed.

Although the reference body A1 is used in the alignment in the +X direction of the two probes 121 and 122 in the embodiment, the reference body A1 may be used to calculate the measurement error due to the angle tilts of the probes 121 and 122.

The process (S12) of acquiring the first data D1 and the second data D2 by using the calibration measurement object A2 will now be described.

Figure 8:
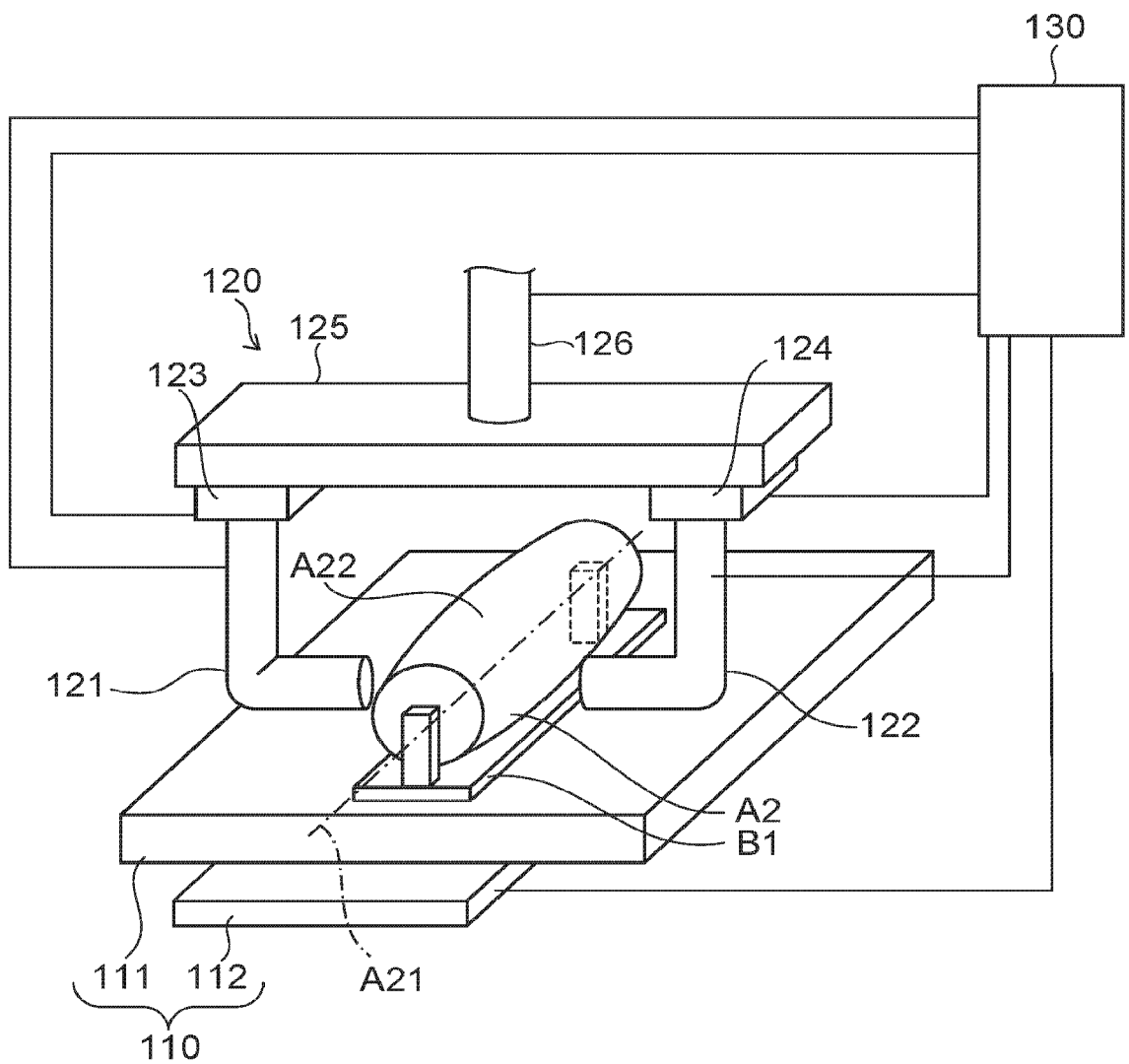
FIG. 8 is a perspective view showing a method for acquiring a first data and a second data in the calibration method.
Figure 8:
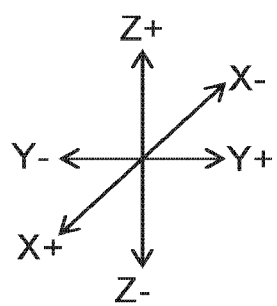

FIG. 8 is a perspective view showing the method for acquiring the first data and the second data in the calibration method.

Figure 9:
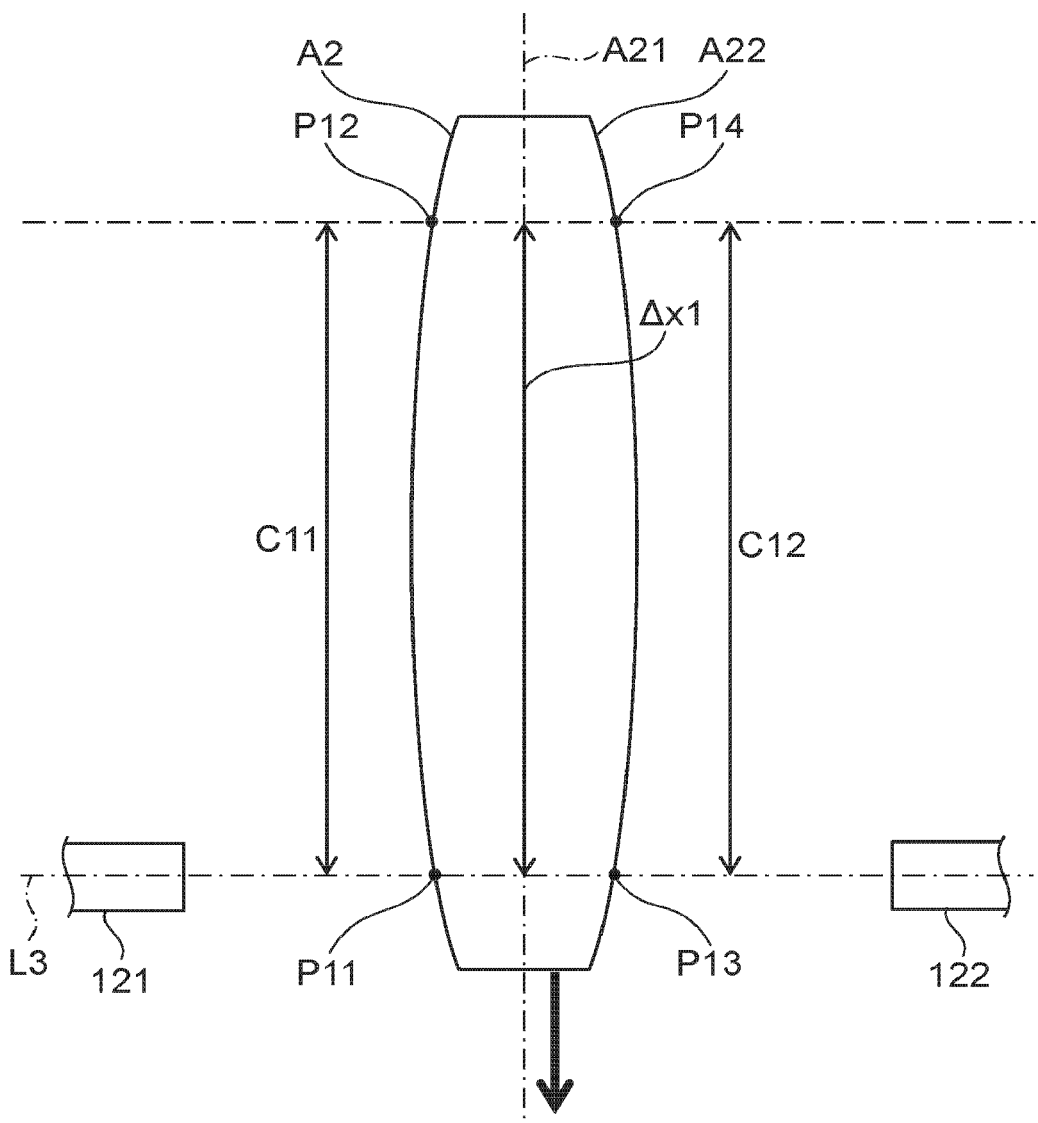
FIG. 9 is a top view showing the method for acquiring the first data and the second data in the calibration method.
Figure 9:
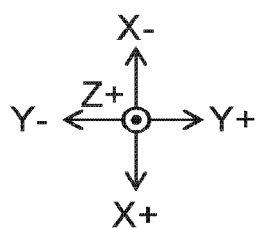

FIG. 9 is a top view showing the method for acquiring the first data and the second data in the calibration method.

In the process (S12), the first data D1 and the second data D2 for estimating the error of the movement of the stage 111 are acquired by using the calibration measurement object A2.

The calibration measurement object A2 is a body of rotation that is rotationally symmetric around one axis A21. For example, the calibration measurement object A2 is processed by a lathe such as an ultraprecision lathe including an air spindle, etc., so that the processing precision is greater than the measurement precision necessary when measuring the surface shape of the measurement object A3. In the embodiment, the longitudinal direction of the calibration measurement object A2 is the direction in which the axis A21 extends, and the dimension in the longitudinal direction of the calibration measurement object A2 is greater than the dimension in the longitudinal direction A34 of the measurement object A3.

In the embodiment, the calibration measurement object A2 is a substantially circular column with the axis A21 as the central axis. An outer circumferential surface A22 of the calibration measurement object A2 is convex away from the axis A21. However, the shape of the calibration measurement object is not particularly limited as long as the calibration measurement object is a body of rotation that is rotationally symmetric around at least one axis. For example, the calibration measurement object may be a substantially circular column, and the outer circumferential surface may be concave toward the central axis. Or, the calibration measurement object may be circular conic, truncated circular conic, or spherical. When the calibration measurement object is spherical, the calibration measurement object may be used as the reference body.

In the process (S12) as shown in FIG. 8, first, the calibration measurement object A2 is placed on the stage 111 so that the axis A21 is parallel to the +X direction in the state in which the calibration measurement object A2 is held by a holder B2.

Then, the controller 130 controls the third moving part 126 and the first probe 121 (or the second probe 122) and moves the holder 125 to a position in the +Z direction to minimize the distance between the calibration measurement object A2 and the first probe 121 (or the second probe 122). Thereby, as shown in FIG. 9, the first probe 121 and the second probe 122 are arranged on a straight line L3 passing through the axis A21 and parallel to the +Y direction.

Then, the controller 130 controls the movement mechanism 112, the first probe 121, and the second probe 122 and acquires the first data D1 of the change of the distance between the first probe 121 and the calibration measurement object A2 and the second data D2 of the change of the distance between the second probe 122 and the calibration measurement object A2 while moving the calibration measurement object A2 in the +X direction.

At this time, as shown in FIG. 9, the movement mechanism 112 moves the stage 111 in the +X direction by the amount of a distance Δx1. Thereby, a first range C11 of the surface of the calibration measurement object A2 from a start point P11 that is positioned on the straight line L3 and faces the first probe 121 before moving the stage 111 to an end point P12 that is separated by the distance Δx1 in the −X direction is scanned by the first probe 121. Also, a second range C12 of the surface of the calibration measurement object A2 from a start point P13 that is positioned on the straight line L3 and faces the second probe 122 before moving the stage 111 to an end point P14 that is separated by the distance Δx1 in the −X direction is scanned by the second probe 122.

In the embodiment, the position in the +X direction of the start point P11 of the first range C11 and the position in the +X direction of the start point P13 of the second range C12 match due to the process S11. Also, the position in the +X direction of the end point P12 of the first range C11 and the position in the +X direction of the end point P14 of the second range C12 match. Accordingly, the entire second range C12 is positioned at the side opposite to the first range C11.

Figure 10:
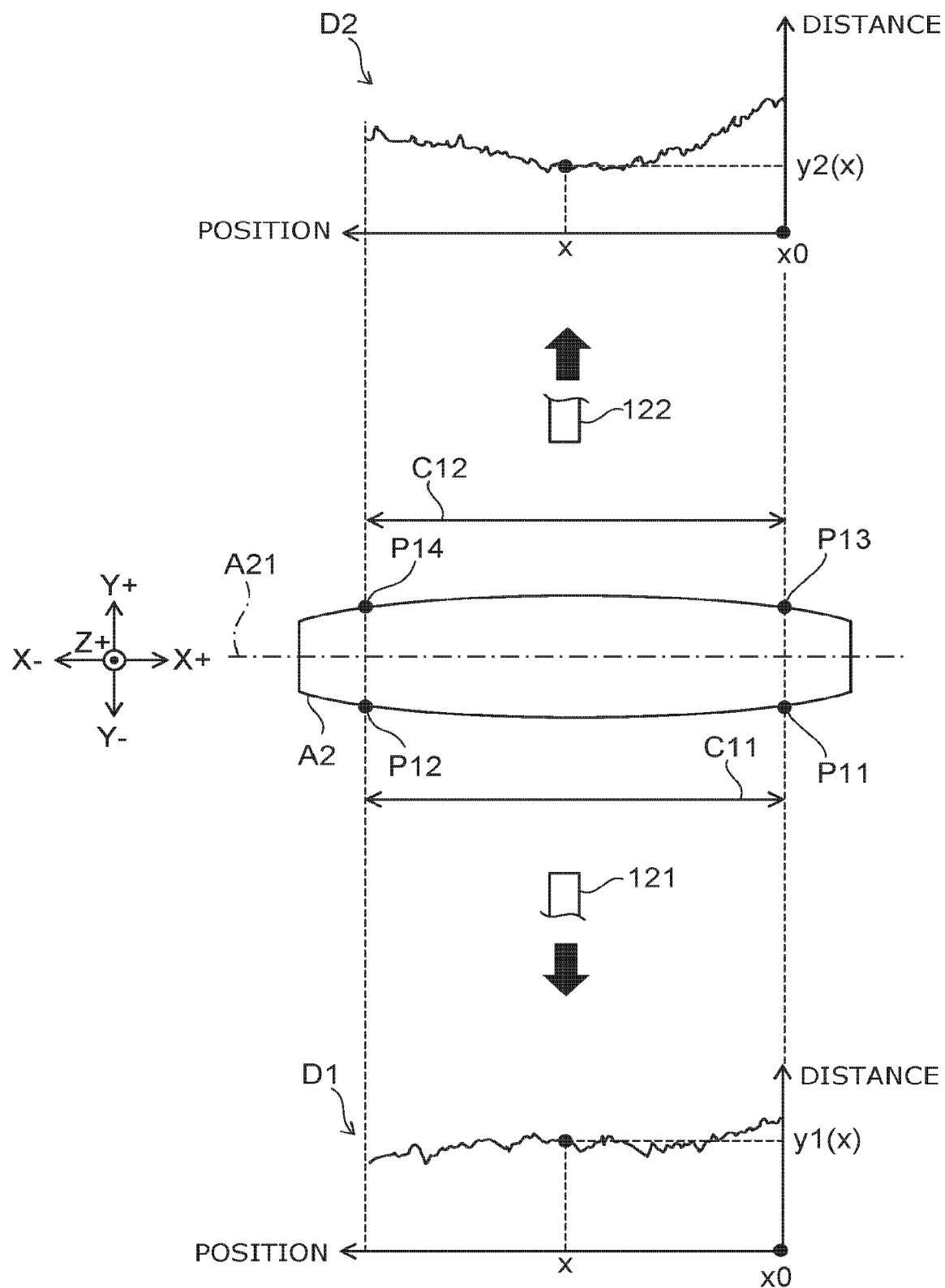
FIG. 10 is a conceptual view showing the first data and the second data.

FIG. 10 is a conceptual view showing the first data and the second data.

The first data D1 is shown in a graph of FIG. 10 in which the horizontal axis is the position in the +X direction of the stage 111, and the vertical axis is the distance. The first data D1 is data in which a measured value $y1(x)$ of the distance between the first probe 121 and the calibration measurement object A2 at each position (x) is associated with the multiple positions (x) in the +X direction of the stage 111. In the first data D1, the multiple positions (x) in the +X direction of the stage 111 correspond to the multiple positions (x) of the calibration measurement object A2 in the +X direction within the first range C11. Hereinbelow, the measured value $y1(x)$ of the distance between the first probe 121 and the calibration measurement object A2 is called the "first measured value $y1(x)$".

Similarly, the second data D2 is shown in a graph of FIG. 10 in which the horizontal axis is the position in the +X direction of the stage 111, and the vertical axis is the distance. The second data D2 is data in which a measured value y2(x) of the distance between the second probe 122 and the calibration measurement object A2 at each position (x) is associated with the multiple positions (x) in the +X direction of the stage 111. In the second data D2, the multiple positions (x) in the +X direction of the stage 111 correspond to the multiple positions (x) of the calibration measurement object A2 in the +X direction within the second range C12. Hereinbelow, the measured value y2(x) of the distance between the second probe 122 and the calibration measurement object A2 is called the "second measured value y2(x)".

Figure 11:
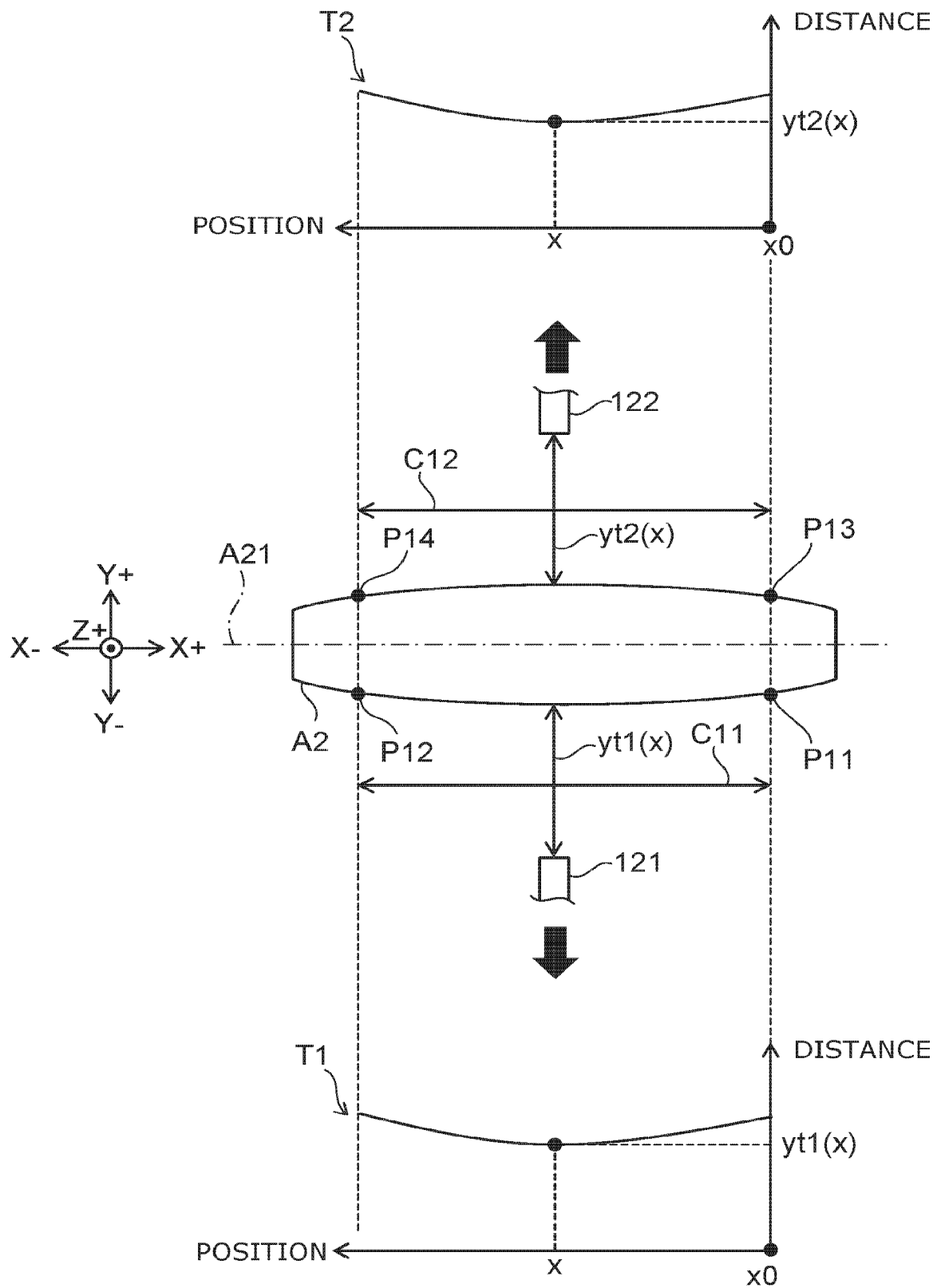
FIG. 11 is a conceptual view showing first virtual data of a change of a distance between the calibration measurement object and the first probe and second virtual data of a change of a distance between the calibration measurement object and the second probe when the stage moves straight along the +X direction.

FIG. 11 is a conceptual view showing first virtual data of the change of the distance between the calibration measurement object and the first probe and second virtual data of the change of the distance between the calibration measurement object and the second probe when the stage moves straight along the +X direction.

The first virtual data T1 is shown in a graph of FIG. 11 in which the horizontal axis is the position in the +X direction of the stage 111, and the vertical axis is the distance. The first virtual data T1 is data in which a distance yt1(x) between the first probe 121 and the calibration measurement object A2 at each position (x) is associated with the multiple positions (x) in the +X direction of the stage 111 when the stage 111 is moved straight along the +X direction. Hereinbelow, the distance yt1(x) is called the "true distance yt1(x)".

Similarly, the second virtual data T2 is shown in a graph of FIG. 11 in which the horizontal axis is the position in the +X direction of the stage 111, and the vertical axis is the distance. The second virtual data T2 is data in which a distance yt2(x) between the second probe 122 and the calibration measurement object A2 at each position (x) is associated with the multiple positions (x) in the +X direction of the stage 111 when the stage 111 is moved straight along the +X direction. Hereinbelow, the distance yt2(x) is called the "true distance yt2(x)".

The change of the true distance yt1(x) along the +X direction of the first virtual data T1 corresponds to the surface shape of the first range C11 of the calibration measurement object A2. The change of the true distance yt2(x) along the +X direction of the second virtual data T2 corresponds to the surface shape of the second range C12 of the calibration measurement object A2. The calibration measurement object A2 is rotationally symmetric around the axis A21, which is parallel to the +X direction. Therefore, the surface shape in the first range C11 of the calibration measurement object A2 and the surface shape in the second range C12 of the calibration measurement object A2 are symmetric with respect to the axis A21. Accordingly, the true distance yt1(x) and the true distance yt2(x) can be assumed to be equal at each position (x) in the +X direction of the stage 111. In other words, the following Formula 1 can be assumed.

$$yt1(x)=yt2(x) \qquad \text{(Formula 1)}$$

yt1(x): true distance between first probe 121 and calibration measurement object A2 yt2(x): true distance between second probe 122 and calibration measurement object A2

Actually, the stage 111 and the calibration measurement object A2 placed on the stage 111 move not only in the +X direction but also slightly in the +Y direction or the −Y direction. The measurement error ep1 of the first probe 121 also exists. Therefore, the first measured value y1(x) at each position (x) in the +X direction of the first data D1 can be represented as in the following Formula 2.

$$y1(x)=yt1(x)+es1(x)+ep1 \qquad \text{(Formula 2)}$$

yt1(x): true distance between first probe 121 and calibration measurement object A2 es1(x): error of movement of stage 111 included in first measured value y1(x)

ep1: measurement error of first probe 121

Similarly, the second measured value y2(x) at each position (x) in the +X direction of the second data D2 can be represented as in the following Formula 3.

$$y2(x)=yt2(x)+es2(x)+ep2 \qquad \text{(Formula 3)}$$

yt2(x): true distance between second probe 122 and calibration measurement object A2 es2(x): error of movement of stage 111 included in second measured value y2(x)

ep2: measurement error of second probe 122

Figure 12:
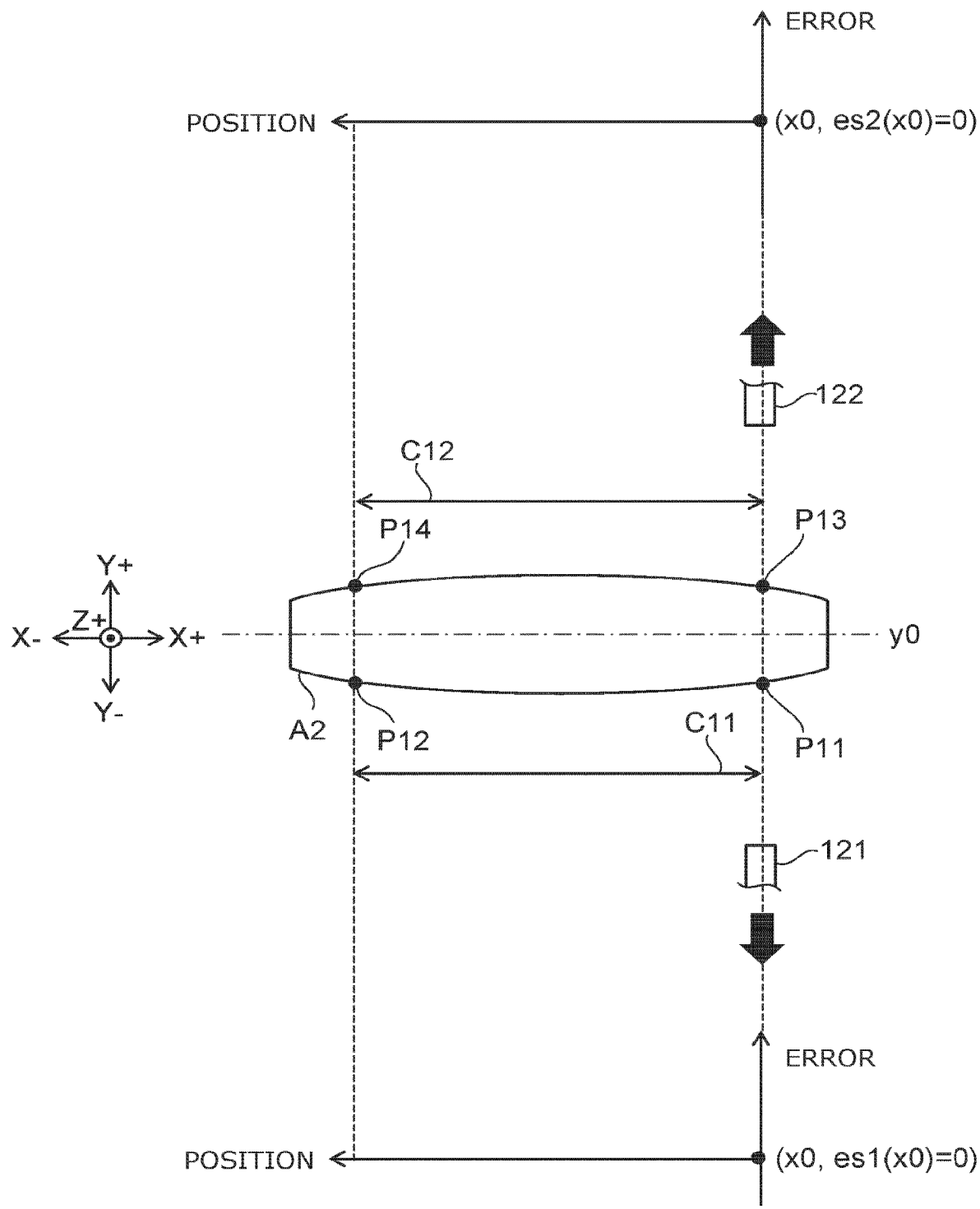
FIG. 12 is a conceptual view showing a relationship between an error of a movement of the stage included in the first data and an error of the movement of the stage included in the second data.
Figure 13:
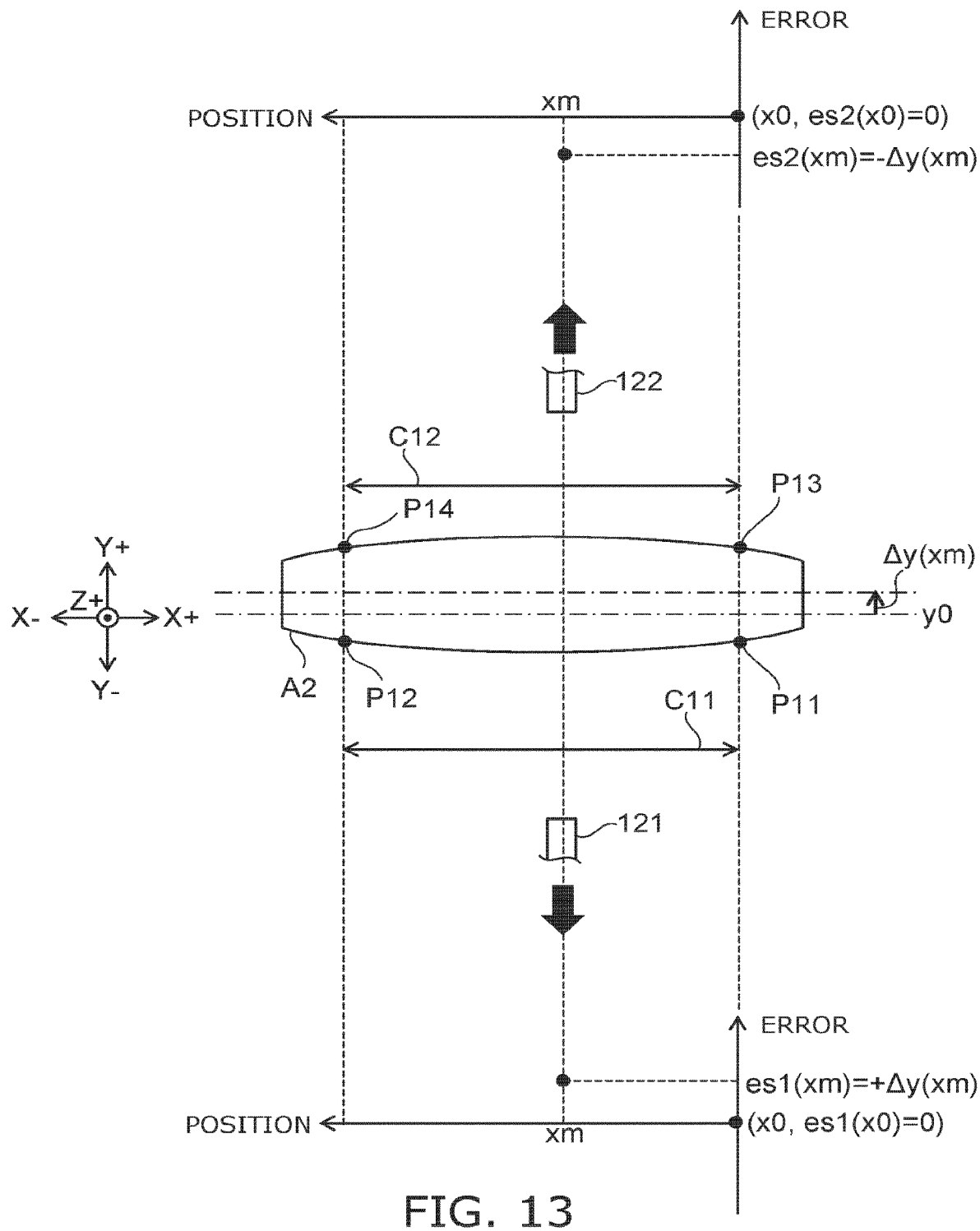
FIG. 13 is a conceptual view showing a relationship between an error of a movement of the stage included in the first data and an error of the movement of the stage included in the second data.
Figure 14:
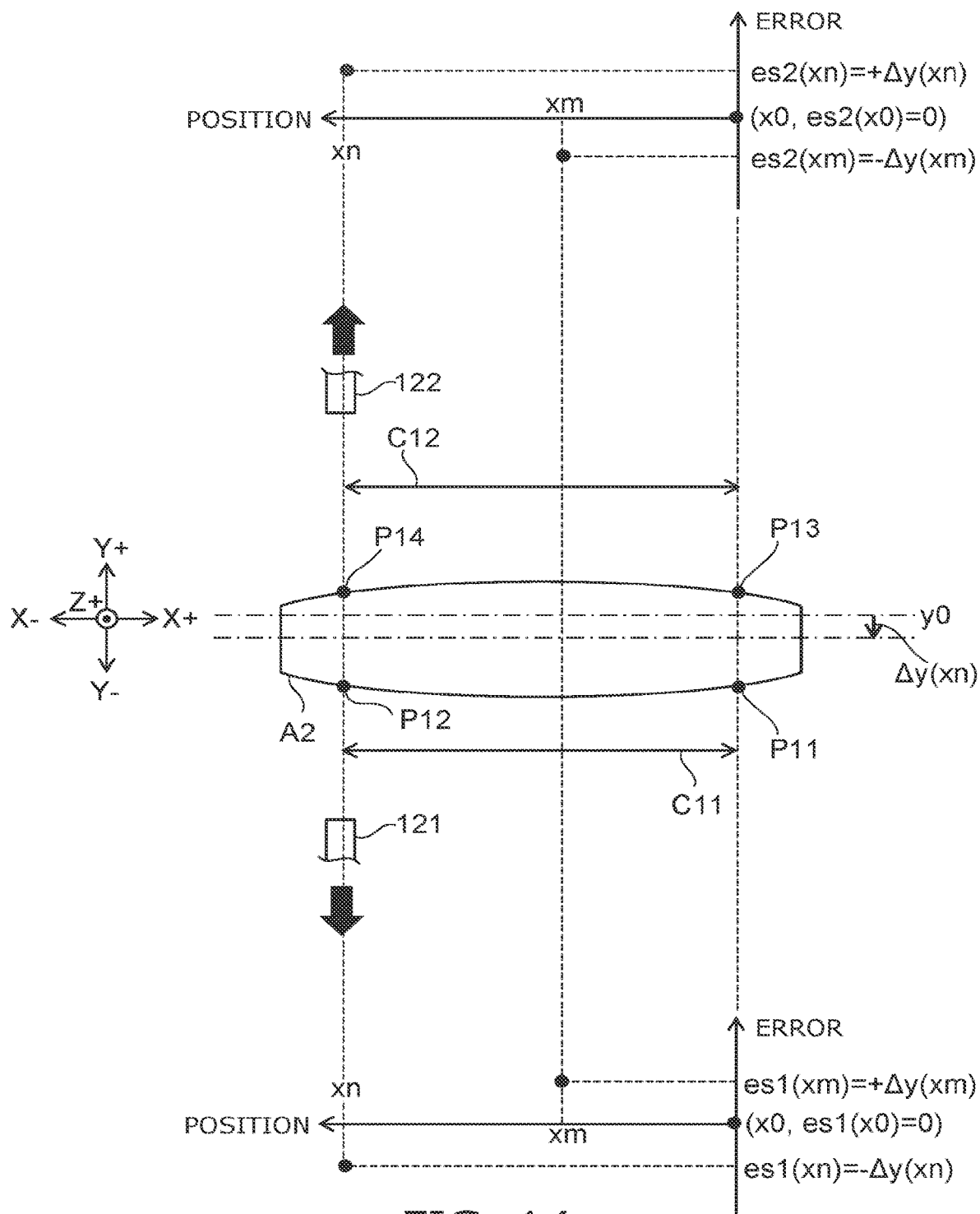
FIG. 14 is a conceptual view showing a relationship between an error of a movement of the stage included in the first data and an error of the movement of the stage included in the second data.

FIGS. 12 to 14 are conceptual views showing the relationship between the error of the movement of the stage included in the first data and the error of the movement of the stage included in the second data.

Hereinbelow, the position in the +X direction of the stage 111 at the start of measuring the first data D1 and the second data D2 as shown in FIG. 12 is called the "initial position (x0)". The position in the +Y direction of the calibration measurement object A2 at the initial position (x0) is called the "initial position (y0)". The error es1(x0) of the movement of the stage 111 included in the first measured value y1(x0) at the initial position (x0) of the first data D1 is taken to be zero. Similarly, the error es2(x0) of the movement of the stage 111 included in the second measured value y2(x0) at the initial position (x0) of the second data D2 is taken to be zero.

When measuring at some position (xm) in the +X direction for the first and second data D1 and D2 as shown in FIG. 13, when the stage 111 moves a distance Δy(xm) in the +Y direction from the initial position (y0), the calibration measurement object A2 is located further from the first probe 121 by the distance Δy(xm) than at the start of the measurement and located closer to the second probe 122 by the distance Δy(xm). Therefore, the error es1(xm) of the movement of the stage 111 included in the first measured value y1(xm) at the position (xm) in the +X direction in the first data D1 is "+Δy(xm)". The error es2(xm) of the movement of the stage 111 included in the second measured value y2(xm) at the position (xm) in the +X direction in the second data D2 is "−Δy(xm)".

When measuring at some position (xn) in the +X direction for the first and second data D1 and D2 as shown in FIG. 14, when the stage 111 is moved a distance Δy(xn) in the −Y direction from the initial position (y0), the calibration measurement object A2 is located closer to the first probe 121 by the distance Δy(xn) than at the start of the measurement and located further from the second probe 122 by the distance Δy(xn). Therefore, at the position (xn) in the +X direction, the error es1(xn) of the movement of the stage 111 included in the first measured value y1(xn) is "−Δy(xn)", and the error es2(xn) of the movement of the stage 111 included in the second measured value y2(xn) is "+Δy(xn)".

Thus, the absolute values of the error es1(x) included in the first measured value y1(x) and the error es2(x) included in the second measured value y2(x) are equal with different positive and negative signs. In other words, the relationship between the error es1(x) and the error es2(x) can be represented by the following Formula 4.

$$es2(x)=-es1(x) \quad \text{(Formula 4)}$$

es1(x): error of movement of stage 111 included in first measured value y1(x)

es2(x): error of movement of stage 111 included in second measured value y2(x)

Because the types of the two probes 121 and 122 are the same, the measurement error ep1 of the first probe 121 and the measurement error ep2 of the second probe 122 can be assumed to be substantially equal. In other words, the relationship between the measurement error ep1 of the first probe 121 and the measurement error ep2 of the second probe 122 can be represented by the following Formula 5.

$$ep2=ep1 \quad \text{(Formula 5)}$$

From Formulas 1 to 5, the error es1(x) at each position (x) in the +X direction of the stage 111 can be represented by the following Formula 6.

$$es1(x)=(y1(x)-y2(x))/2 \quad \text{(Formula 6)}$$

Figure 15:
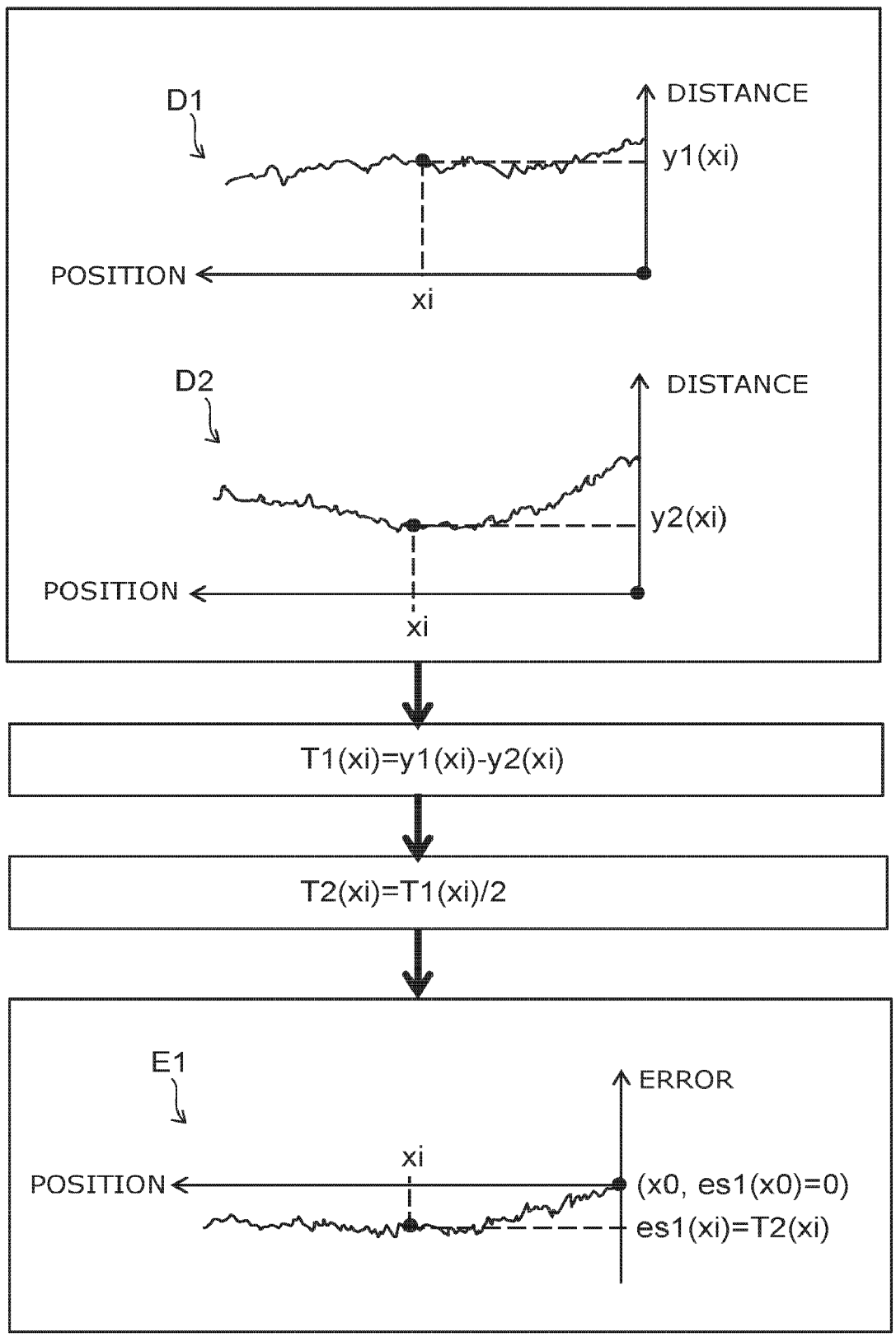
FIG. 15 is a conceptual view showing a method for estimating the error of the movement of the stage included in the first data.

FIG. 15 is a conceptual view showing a method for estimating the error of the movement of the stage included in the first data.

Based on Formula 6, the error es1(x) included in the first data D1 can be estimated as follows. The controller 130 calculates a value T1(xi) by subtracting the second measured value y2(xi) at the position (xi) in the +X direction of the second data D2 from the first measured value y1(xi) at the position (xi) in the +X direction of the first data D1. In other words, T1(xi)=y1(xi)-y2(xi). Then, the controller 130 calculates the value T2(xi), which is one-half of the value T1(xi). In other words, T2(xi)=T1(xi)/2. Then, the controller 130 estimates the value T2(xi) to be the error es1(xi) of the movement of the stage 111 at the position (xi). The controller 130 performs the processing described above for all positions (x) in the +X direction of the first data D1.

Thereby, first error data E1 is generated in which the error es1(x) of the movement of the stage 111 at each position (x) is associated with the multiple positions (x) in the +X direction of the stage 111.

When the measurement error ep1 of the first probe 121 and the measurement error ep2 of the second probe 122 are not equal, the controller 130 may set T1(x)=(y1(x)-ep1)-(y2(x)-ep2). When the measurement error of the first probe 121, the measurement error ep1(x) of the second probe 122, and the measurement error ep2(x) of the second probe 122 are different at each position in the +X direction, the controller 130 may set T1(x)=(y1(x)-ep1(x))-(y2(x)-ep2(x)).

Figure 16:
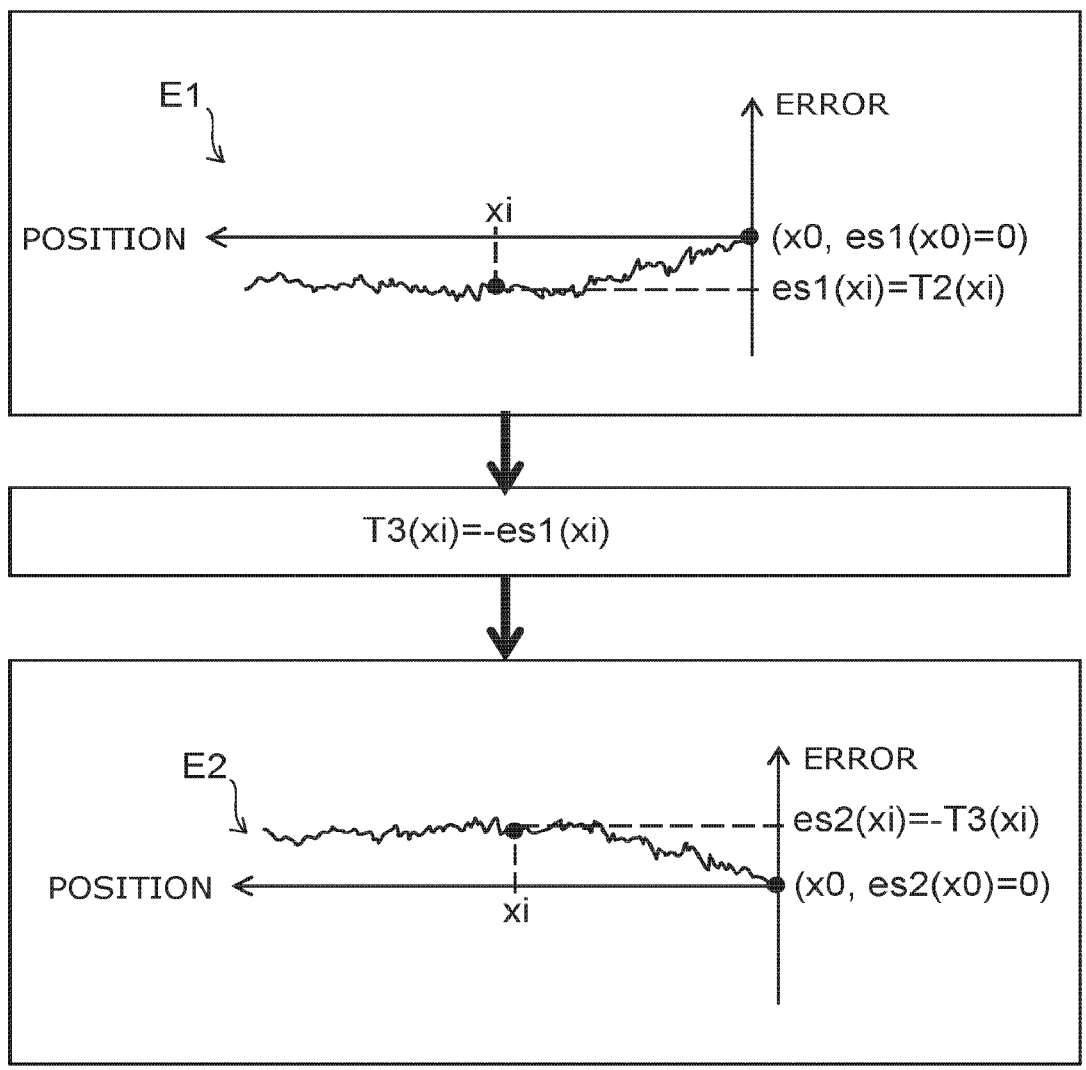
FIG. 16 is a conceptual view showing the method for estimating the error of the movement of the stage included in the second data.

FIG. 16 is a conceptual view showing the method for estimating the error of the movement of the stage included in the second data.

The controller 130 calculates a value T3(xi) by reversing the sign of the error es1(xi) at the position (xi) in the +X direction of the first error data E1. In other words, T3(xi)=-es1(xi). Then, the controller 130 estimates the value T3(xi) to be the error es2(xi) of the movement of the stage 111 at the position (xi). The controller 130 performs the processing described above for all positions (x) in the +X direction of the first error data E1.

Thus, second error data E2 is generated in which the error es2(x) of the movement of the stage 111 at each position (x) is associated with the multiple positions (x) in the +X direction of the stage 111. However, the second error data E2 may not be generated when the second probe 122 is not used when measuring the measurement object A3.

The error when moving the stage 111 in the -X direction also may be estimated using a similar method. It is sufficient for the calibration method described above to be performed at least once before measuring the surface shape of the measurement object A3 described below.

Method for Estimating Surface Shape of Measurement Object

The method for estimating the surface shape of the measurement object in the shape measurement method according to the embodiment will now be described.

Figure 17:
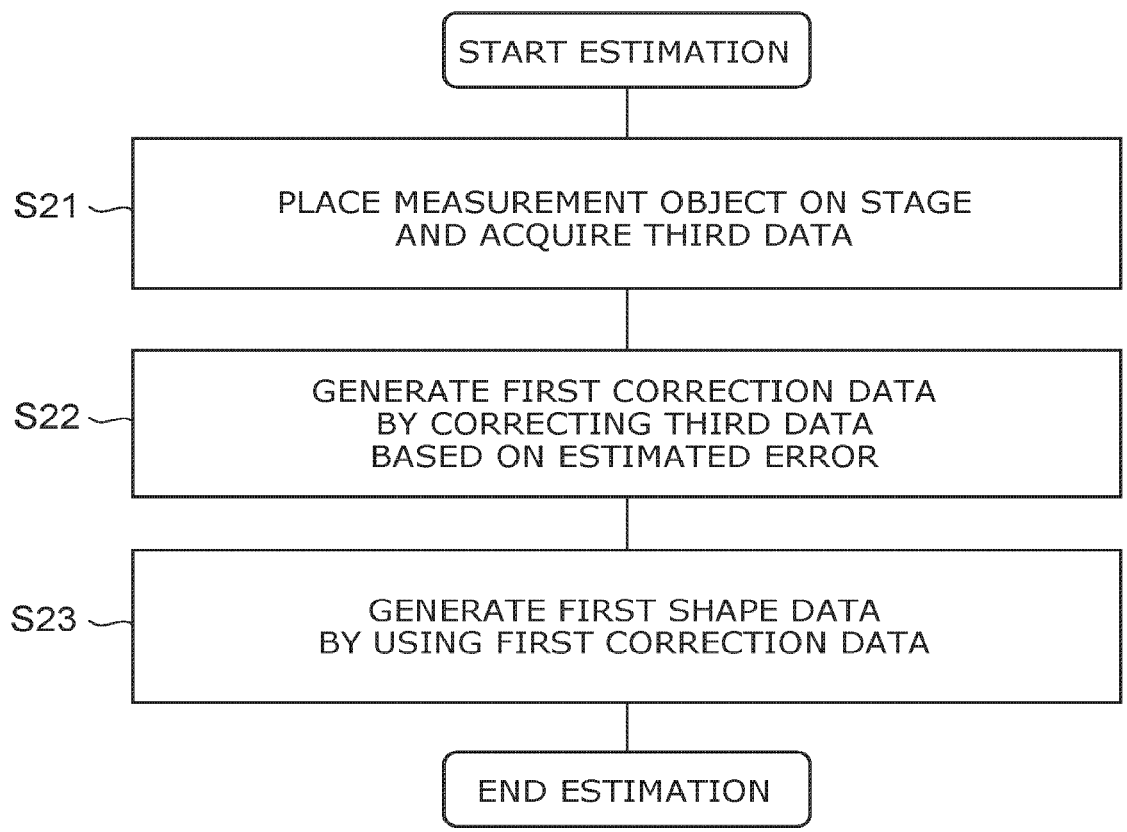
FIG. 17 is a flowchart showing a method for estimating a surface shape of the measurement object in the shape measurement method according to the first embodiment.

FIG. 17 is a flowchart showing a method for estimating a surface shape of a measurement object in the shape measurement method according to the embodiment.

Generally speaking, as shown in FIG. 17, the method for estimating the surface shape of the measurement object of the embodiment includes a process (S21) of placing the measurement object A3 on the stage 111 and acquiring third data D3, a process (S22) of generating first correction data D5 by correcting the third data D3 based on the estimated error es1(x), and a process (S23) of generating first shape data D7 by using the first correction data D5. The processes will now be elaborated.

First, the process (S21) of placing the measurement object A3 on the stage 111 and acquiring the third data D3 will be described.

Figure 18:
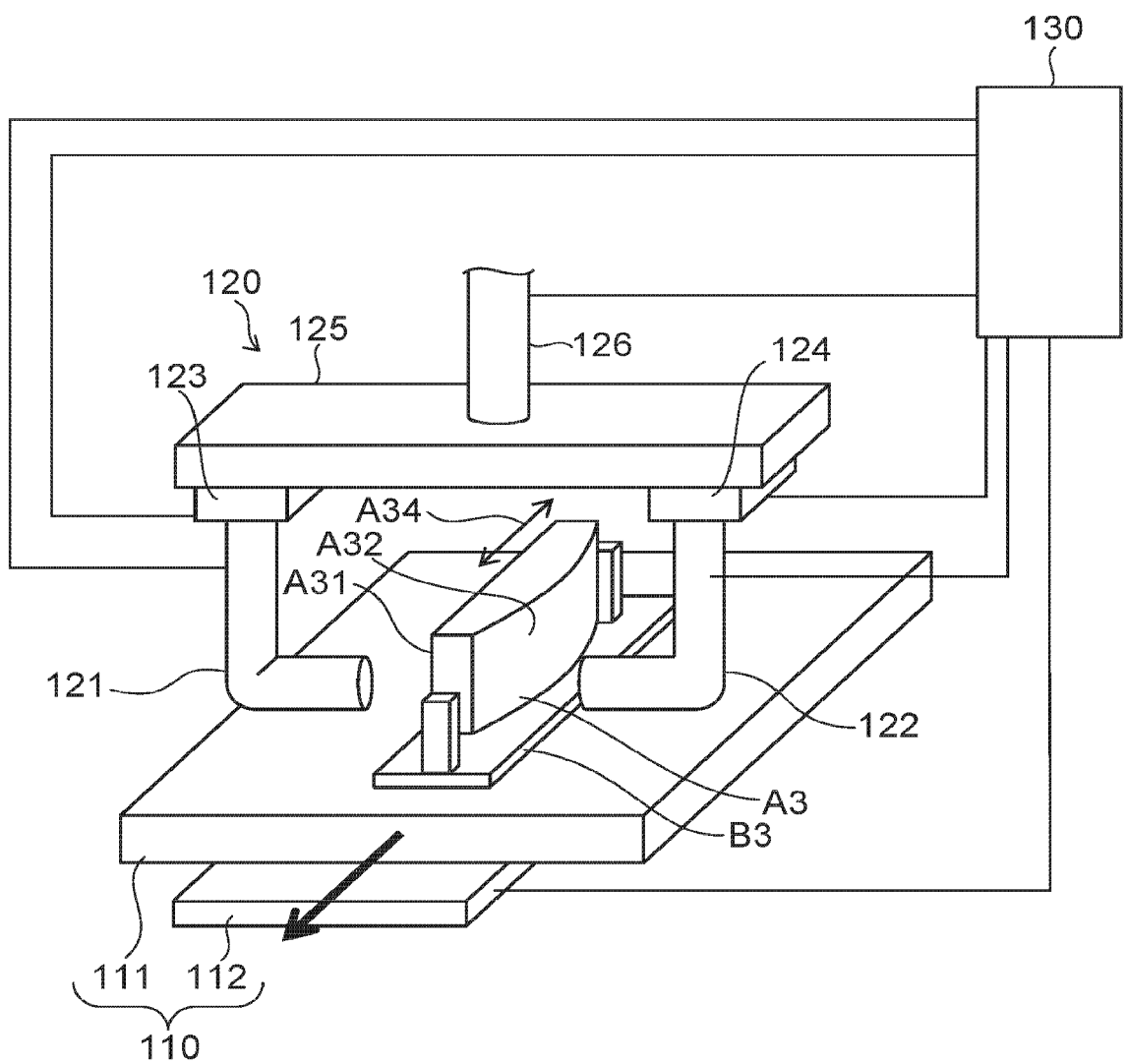
FIG. 18 is a perspective view showing a method for acquiring a third data and a fourth data in the method for estimating the surface shape of the measurement object.
Figure 18:
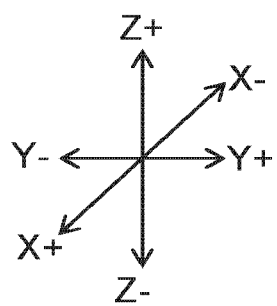

FIG. 18 is a perspective view showing a method for acquiring the third data and fourth data in the method for estimating the surface shape of the measurement object.

Figure 19:
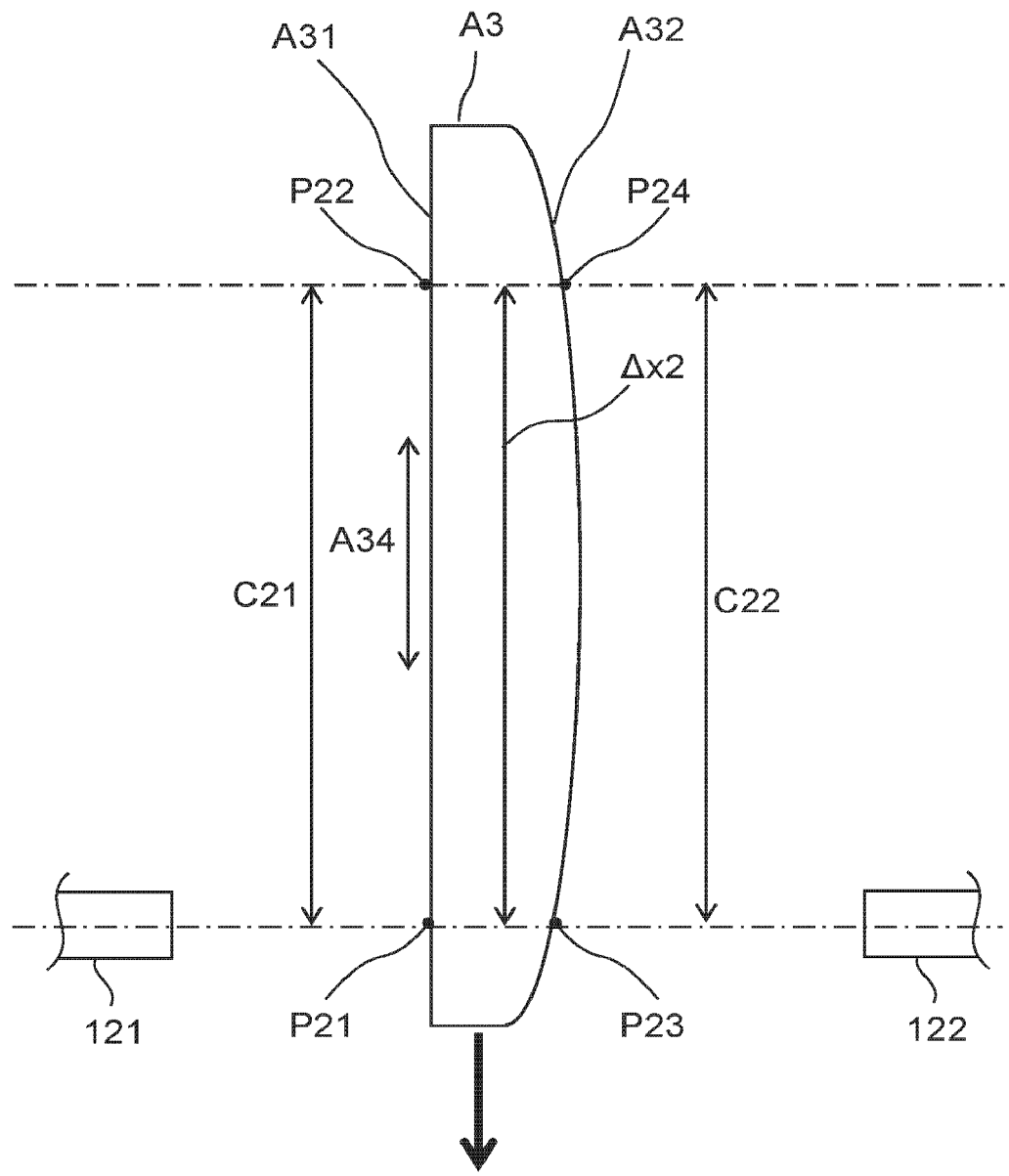
FIG. 19 is a top view showing the method for acquiring the third data and the fourth data in the method for estimating the surface shape of the measurement object.

FIG. 19 is a top view showing the method for acquiring the third data and the fourth data in the method for estimating the surface shape of the measurement object.

In the process (S21), first, the measurement object A3 is placed on the stage 111 so that the longitudinal direction A34 of the measurement object A3 is parallel to the +X direction in a state in which the measurement object A3 is held by a holder B3.

An example will now be described in which both the surface shape of the first surface A31 and the surface shape of the second surface A32 of the measurement object A3 are measured using both the first probe 121 and the second probe 122. However, only one of the surface shape of the first surface A31 or the surface shape of the second surface A32 of the measurement object A3 may be measured using only one of the first probe 121 or the second probe 122.

Then, the controller 130 controls the movement mechanism 112, the first probe 121, and the second probe 122 and acquires the third data D3 of the change of the distance between the measurement object A3 and the first probe 121 and the fourth data D4 of the change of the distance between the measurement object A3 and the second probe 122 while moving the measurement object A3 in the +X direction.

When acquiring the third data D3 and the fourth data D4 as shown in FIG. 19, the movement mechanism 112 moves the stage 111 by a distance Δx2 in the +X direction. The distance Δx2 is less than the distance Δx1. Thereby, a first range C21 of the first surface A31 of the measurement object A3 from a start point P21 that faces the first probe 121 before moving the stage 111 to an end point P22 that is separated by the distance Δx2 is scanned by the first probe 121. Also, a second range C22 of the second surface A32 of the measurement object A3 from a start point P23 that faces the second probe 122 before moving the stage 111 to an end point P24 that is separated by the distance Δx2 in the -X direction is scanned by the second probe 122.

In the embodiment, the position in the +X direction of the start point P21 of the first range C21 and the position in the +X direction of the start point P23 of the second range C22 match each other. Also, the position in the +X direction of the end point P22 of the first range C21 and the position in the +X direction of the end point P24 of the second range C22 match each other. However, the position in the +X direction of the start point P21 and the position in the +X direction of the start point P23 may not match each other. Also, the position in the +X direction of the end point P22 and the position in the +X direction of the end point P24 may not match each other.

In the embodiment, the initial position in the +X direction of the stage 111 when acquiring the third data D3 and the fourth data D4 matches the initial position (x0) in the +X direction of the stage 111 when acquiring the first data D1 and the second data D2. However, the initial position in the +X direction of the stage 111 when acquiring the third data D3 and the fourth data D4 is not limited to that described above as long as each position in the +X direction of the stage 111 when acquiring the third data D3 and the fourth data D4 is between the initial position (x0) and the final position in the +X direction of the stage 111 when acquiring the first data D1 and the second data D2.

Figure 20:
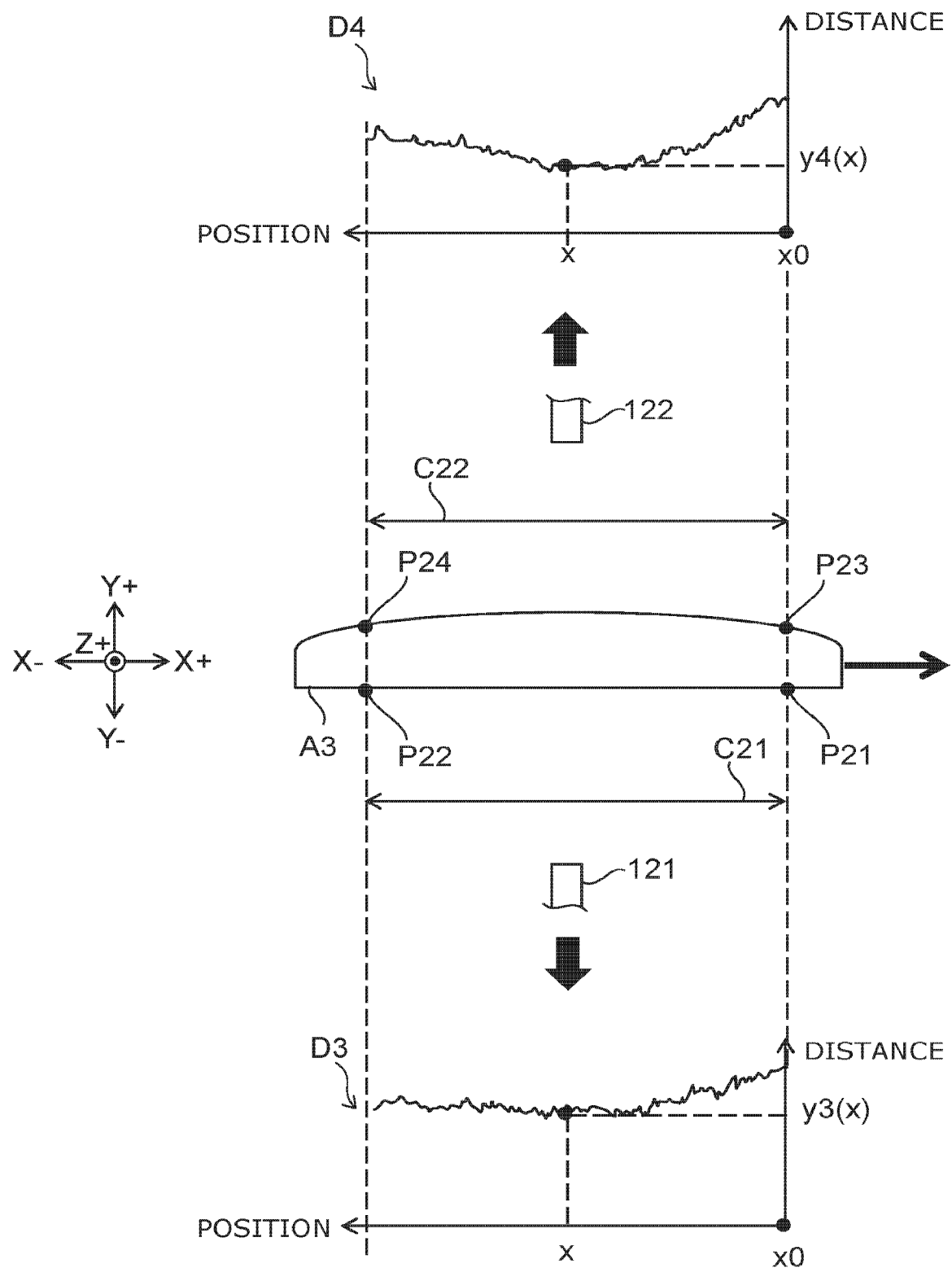
FIG. 20 is a conceptual view showing the third data and the fourth data.

FIG. 20 is a conceptual view showing the third data and the fourth data.

The third data D3 is shown in a graph of FIG. 20 in which the horizontal axis is the position in the +X direction of the stage 111, and the vertical axis is the distance. The third data D3 is data in which a measured value $y3(x)$ of the distance between the first probe 121 and the measurement object A3 at each position (x) is associated with the multiple positions (x) in the +X direction of the stage 111. The multiple positions (x) in the +X direction of the stage 111 in the third data D3 correspond to multiple positions of the measurement object A3 in the +X direction within the first range C21. Hereinbelow, the measured value $y3(x)$ of the distance between the first probe 121 and the measurement object A3 is called the "third measured value $y3(x)$".

Similarly, the fourth data D4 is shown in a graph of FIG. 20 in which the horizontal axis is the position in the +X direction of the stage 111, and the vertical axis is the distance. The fourth data D4 is data in which a measured value $y4(x)$ of the distance between the second probe 122 and the measurement object A3 at each position (x) is associated with the multiple positions (x) in the +X direction of the stage 111. The multiple positions (x) in the +X direction of the stage 111 in the fourth data D4 correspond to multiple positions of the measurement object A3 in the +X direction within the second range C22. Hereinbelow, the measured value $y4(x)$ of the distance between the second probe 122 and the measurement object A3 is called the "fourth measured value $y4(x)$".

The process (S22) of generating the first correction data D5 by correcting the third data D3 based on the estimated error $es1(x)$ will now be described.

Figure 21:
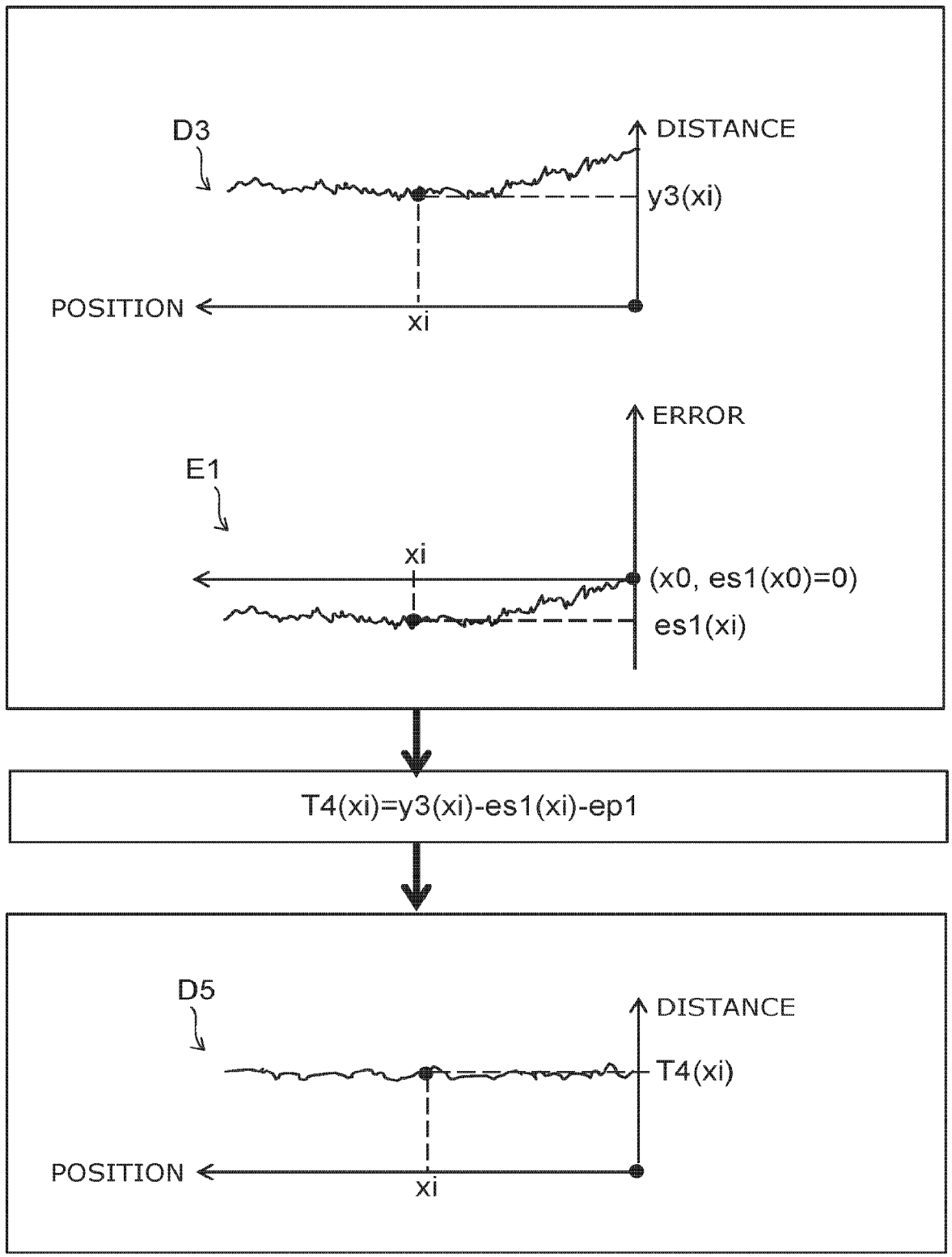
FIG. 21 is a conceptual view showing a method for generating a first correction data in the method for estimating the surface shape of the measurement object.

FIG. 21 is a conceptual view showing a method for generating the first correction data in the method for estimating the surface shape of the measurement object.

Figure 22:
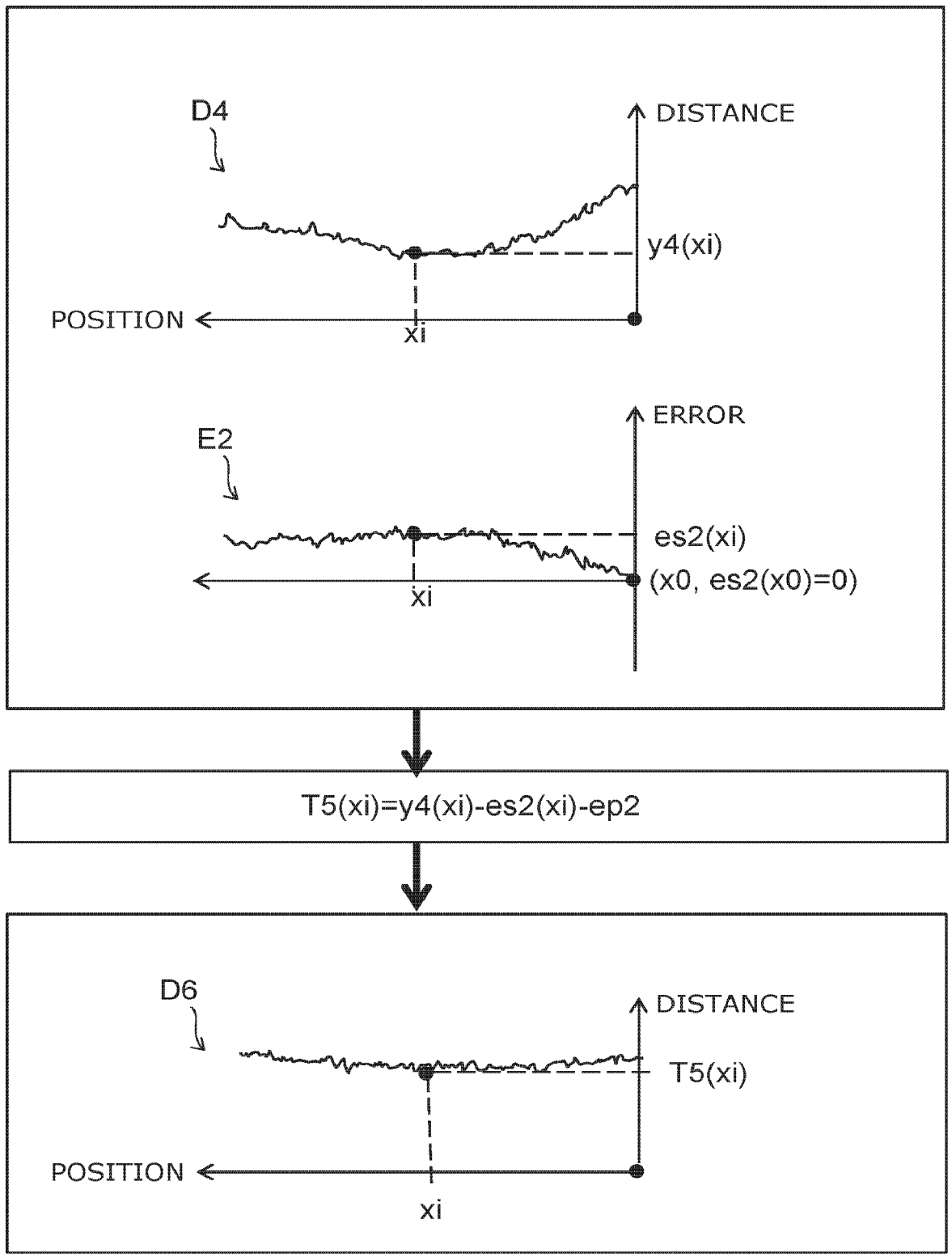
FIG. 22 is a conceptual view showing a method for generating a second correction data in the method for estimating the surface shape of the measurement object.

FIG. 22 is a conceptual view showing a method for generating second correction data in the method for estimating the surface shape of the measurement object.

The reproducibility of the error $es1(x)$ of the movement of the stage 111 is high. Therefore, the third measured value $y3(x)$ at each position (x) in the +X direction of the third data D3 can be represented as in the following Formula 7.

$$y3(x)=yt3(x)+es1(x)+ep1 \quad \text{(Formula 7)}$$

$yt3(x)$: true distance between first probe 121 and measurement object A3

$es1(x)$: error of movement of stage 111 included in first measured value $y1(x)$ $ep1$: measurement error of first probe 121

Here, the true distance $yt3(x)$ means the distance between the first probe 121 and the measurement object A3 at the position (x) in the +X direction when the stage 111 is moved straight along the +X direction.

Similarly, the reproducibility of the error $es2(x)$ of the movement of the stage 111 is high. Therefore, the fourth measured value $y4(x)$ at each position (x) in the +X direction of the fourth data D4 can be represented as in the following Formula 8.

$$y4(x)=yt4(x)+es2(x)+ep2 \quad \text{(Formula 8)}$$

$yt4(x)$: true distance between second probe 122 and measurement object A3

$es2(x)$: error of movement of stage 111 included in second measured value $y2(x)$ $ep2$: measurement error of second probe 122

Here, the true distance $yt4(x)$ means the distance between the second probe 122 and the measurement object A3 at the position (x) in the +X direction when the stage 111 is moved straight along the +X direction.

From Formula 7, the controller 130 generates the first correction data D5 by correcting the third data D3 as follows. As shown in FIG. 21, the controller 130 calculates a value $T4(xi)$ by subtracting the error $es1(xi)$ at some position (xi) of the first error data E1 and the measurement error $ep1$ of the first probe 121 from the third measured value $y3(xi)$ at the position (xi) in the +X direction of the third data D3. In other words, $T4(xi)=y3(xi)-es1(xi)-ep1$. The controller 130 performs the processing described above for all positions (x) in the +X direction of the third data D3. Hereinbelow, the value $T4(x)$ is called the "corrected value $T4(x)$". Thereby, the first correction data D5 is generated in which the corrected value $T4(x)$ at each position (x) is associated with the multiple positions (x) in the +X direction of the first range C21. The corrected value $T4(x)$ is estimated to be the true distance $yt3(x)$ between the first probe 121 and the first surface A31.

Similarly, as shown in FIG. 22, the controller 130 calculates a value $T5(xi)$ by subtracting the error $es2(xi)$ at some position (xi) of the second error data E2 and the measurement error $ep2$ of the second probe 122 from the fourth measured value $y4(xi)$ at the position (xi) in the +X direction of the fourth data D4. In other words, $T5(xi)=y4(xi)-es2(xi)-ep2$. The controller 130 performs the processing described above for all positions (x) in the +X direction of the fourth data D4. Hereinbelow, the value $T5(x)$ is called the "corrected value $T5(x)$". Thereby, second correction data D6 is generated in which the corrected value $T5(x)$ at each position (x) is associated with the multiple positions (x) in the +X direction of the second range C22. The corrected value $T5(x)$ is estimated to be the true distance $yt4(x)$ between the second probe 122 and the second surface A32.

The process (S23) of generating the first shape data D7 by using the first correction data D5 will now be described.

Figure 23:
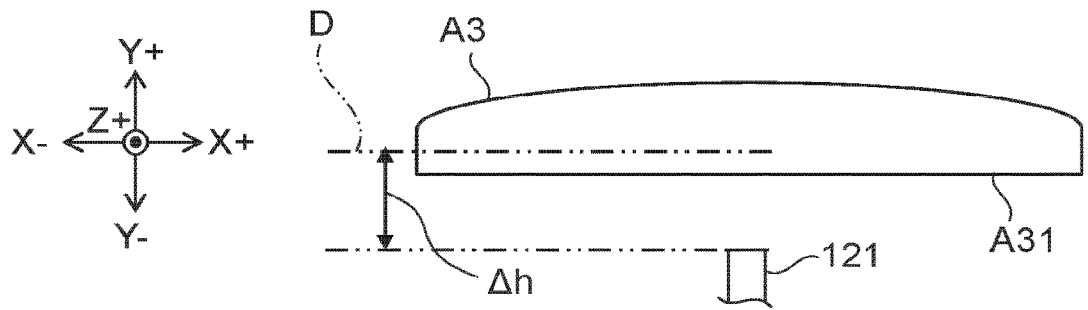
FIG. 23 is a conceptual view showing a method for generating a first shape data in the method for estimating the surface shape of the measurement object.
Figure 23:
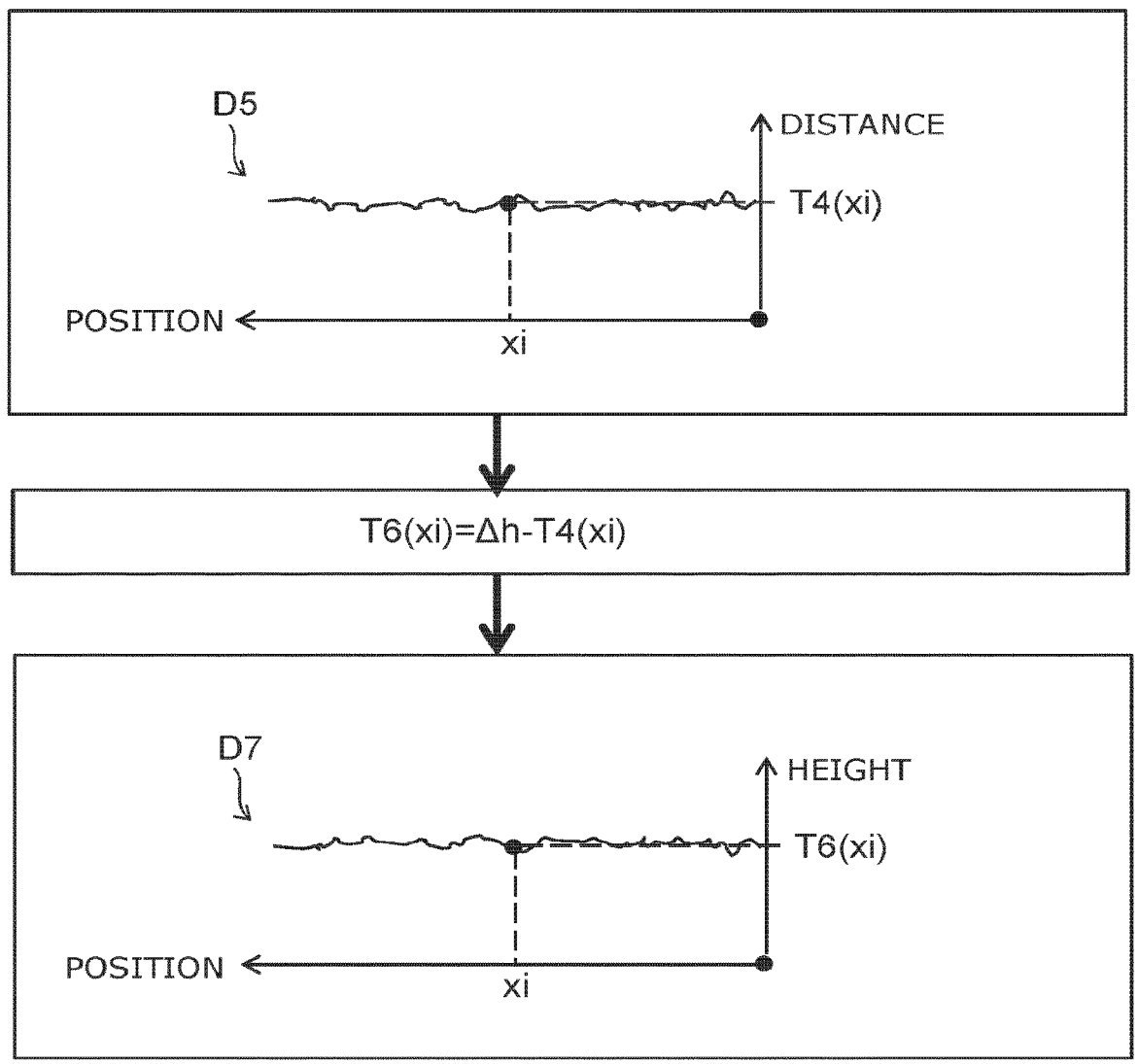

FIG. 23 is a conceptual view showing a method for generating the first shape data in the method for estimating the surface shape of the measurement object.

Figure 24:
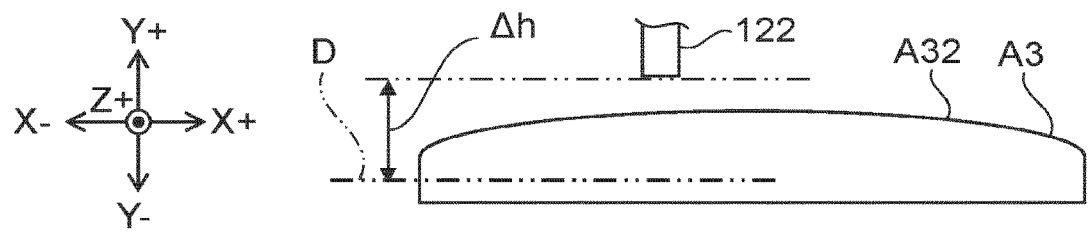
FIG. 24 is a conceptual view showing a method for generating a second shape data in the method for estimating the surface shape of the measurement object.
Figure 24:
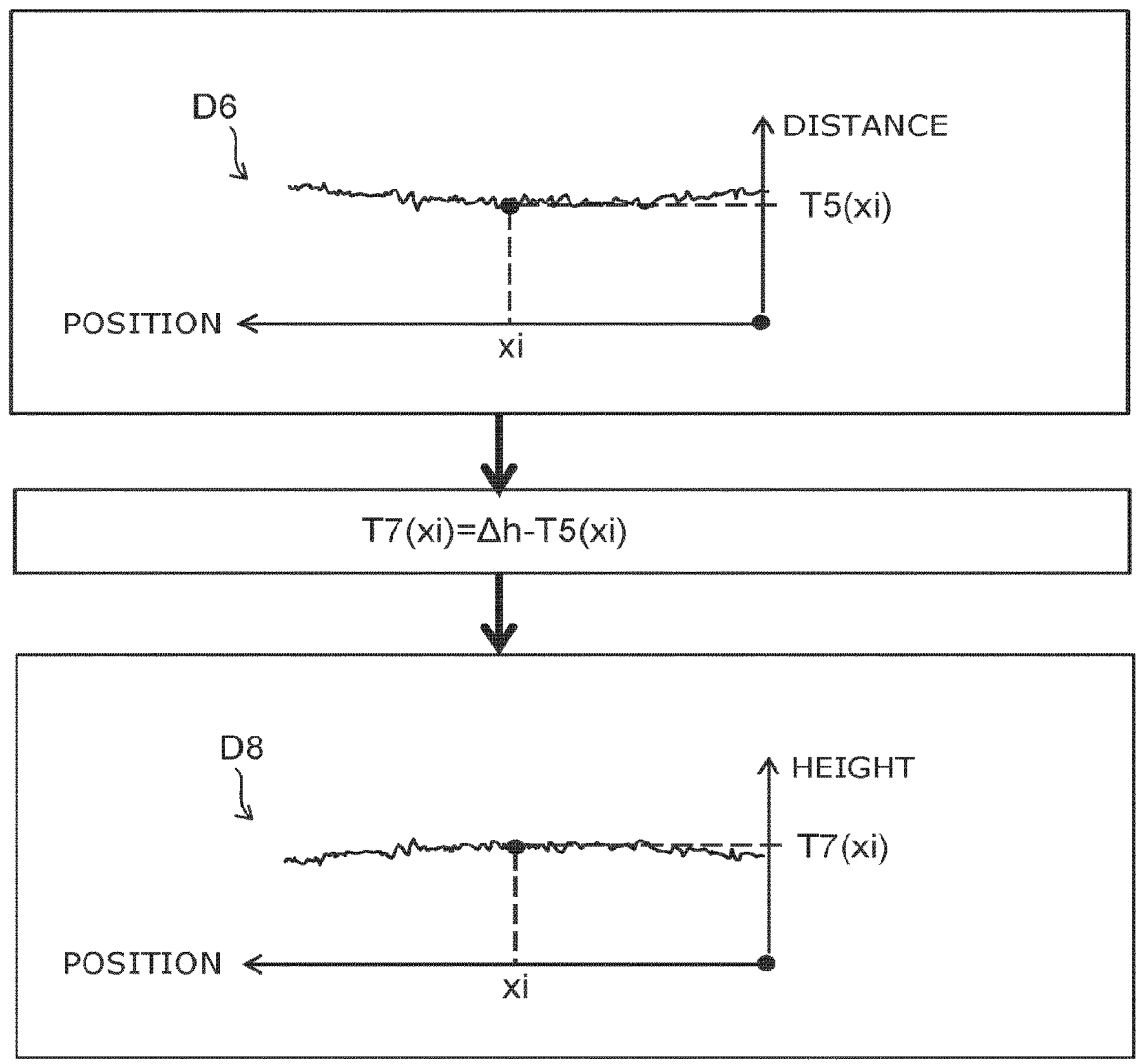

FIG. 24 is a conceptual view showing a method for generating second shape data in the method for estimating the surface shape of the measurement object.

The controller 130 calculates a value T6(xi) by subtracting the corrected value T4(xi) at some position (xi) in the +X direction of the first correction data D5 from the distance Δh between the first probe 121 and the reference surface D, which is parallel to the +X direction and the +Z direction. In other words, T6(xi)=Δh−T4(xi). The value T6(xi) is estimated to be the height of the first surface A31 from the reference surface D at some position (xi) in the +X direction of the first range C21. The controller 130 performs the processing described above for all positions (x) in the +X direction of the first correction data D5. Thereby, the first shape data D7 is generated in which the height T6(x) of the first surface A31 at each position (x) is associated with the multiple positions in the +X direction of the first range C21.

Similarly, the controller 130 calculates a value T7(xi) by subtracting the corrected value T5(xi) at some position (xi) in the +X direction of the second correction data D6 from the distance Δh between the reference surface D and the second probe 122. In other words, T7(xi)=Δh−T5(xi). The value T7(xi) is estimated to be the height of the second surface A32 from the reference surface D at some position (xi) in the +X direction of the second range C22. The controller 130 performs the processing described above for all positions (x) in the +X direction of the second correction data D6. Thereby, second shape data D8 is generated in which the height T7(x) of the second surface A32 at each position (x) is associated with the multiple positions in the +X direction of the second range C22.

Then, the controller 130 outputs the first shape data D7 and the second shape data D8. The change in the +X direction of the height T6(x) in the first shape data D7 corresponds to the surface shape of the first surface A31 in the first range C21. Similarly, the change in the +X direction of the height T7(x) in the second shape data D8 corresponds to the surface shape of the second surface A32 in the second range C22.

Because it is sufficient to ascertain the change in the +X direction of the height of the first surface A31, the error ep1 of the first probe 121 may not be subtracted from the third measured value y3(x) when calculating the corrected value T4(x) if it can be assumed that the measurement error ep1 of the first probe 121 is substantially constant at each position in the +X direction. Similarly, because it is sufficient to ascertain the change in the +X direction of the height of the second surface A32, the error ep2 of the second probe 122 may not be subtracted from the fourth measured value y4(x) when calculating the corrected value T5(x) if it can be assumed that the measurement error ep2 of the second probe 122 is substantially constant at each position in the +X direction.

Effects of the embodiment will now be described.

In the shape measurement method according to the embodiment, the first data D1 of the change of the distance between the calibration measurement object A2 and the first probe 121 and the second data D2 of the change of the distance between the calibration measurement object A2 and the second probe 122 are acquired while moving the calibration measurement object A2, which is rotationally symmetric around the axis A21 parallel to the first direction (the +X direction), relative to the first and second probes 121 and 122 in the first direction between the first probe 121 and the second probe 122, which are arranged in the second direction (the +Y direction) orthogonal to the first direction. Then, the error es1(x) of the movement included in the first data D1 is estimated based on the first and second data D1 and D2. Then, the third data D3 of the change of the distance between the measurement object A3 and the first probe 121 is acquired while moving the measurement object A3 relative to the first probe 121 in the first direction. Then, the third data D3 is corrected using the error es1(x). Therefore, the error es1(x) of the movement can be estimated, and the surface shape of the measurement object A3 can be measured with high accuracy by utilizing the estimated error es1(x).

Figure 25A:
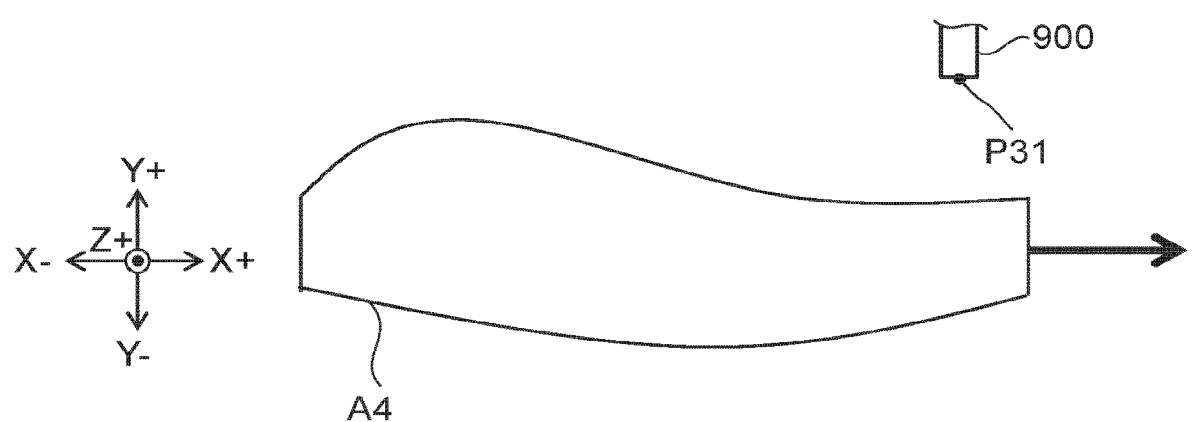
FIG. 25A is a top view showing a probe and a calibration member in a calibration method according to a reference example.
Figure 25B:
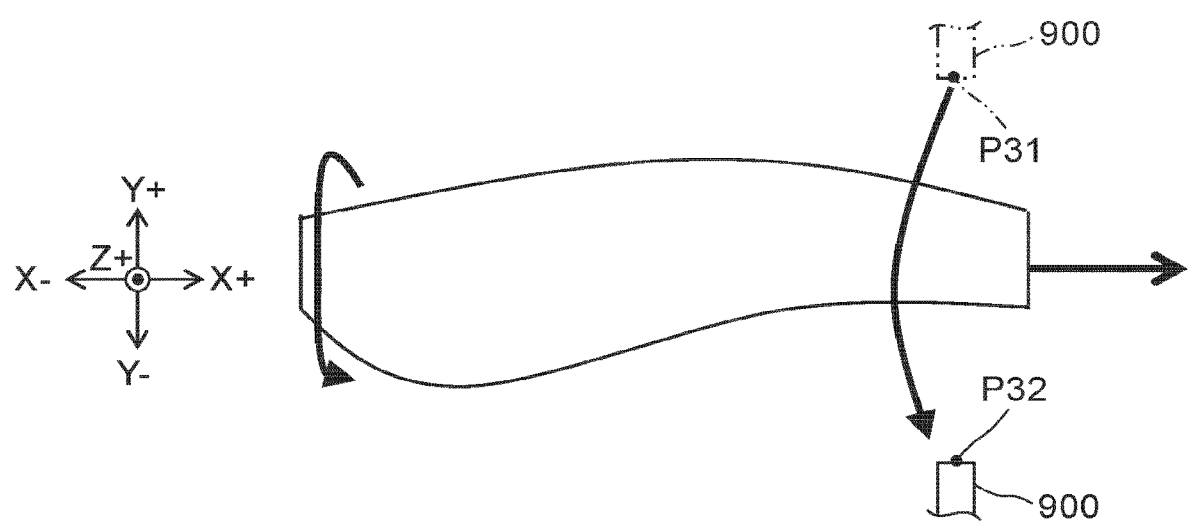
FIG. 25B is a top view showing a state after rotating the calibration member and moving the probe from the state of FIG. 25A.

FIG. 25A is a top view showing a probe and a calibration member in a calibration method according to a reference example, and FIG. 25B is a top view showing a state after rotating the calibration member and moving the probe from the state of FIG. 25A.

In the calibration method according to the reference example, the probe 900 is located at a first position P31 and acquires the first data of the change of the distance between the probe 900 and the calibration member A4 while moving, in the +X direction, the calibration member A4, which is not rotationally symmetric with respect to an axis parallel to the +Z direction.

Then, the calibration member A4 is rotated 180 degrees around an axis parallel to the +X direction. Also, the probe 900 is moved to a second position P32 at the side opposite to the first position P31 so that the calibration member A4 is interposed between the first position P31 and the second position P32.

Then, the second data of the change of the distance between the probe 900 and the calibration member A4 is acquired while moving the calibration member A4 in the +X direction.

In such a method as well, the absolute values of the error of the movement included in the first data and the error of the movement included in the second data are equal, but the positive and negative signs are different. Therefore, it is also possible to estimate the error of the movement by using the first and second data acquired by such a method. However, in such a method, the error of the movement cannot be estimated with high accuracy because an error of the rotation occurs when rotating the calibration member A4. Conversely, in the shape measurement method according to the embodiment, the calibration measurement object A2 is a body of rotation that is rotationally symmetric around the axis A21. Therefore, the error es1(x) can be estimated without rotating the calibration measurement object A2. As a result, the error es1(x) can be estimated with high accuracy.

The shape measurement method according to the embodiment includes, before the process of estimating the errors, a process of moving the first probe 121 and the second probe 122 to positions to minimize the distances in the first direction to the reference body A1, which is rotationally symmetric around the axis A11 parallel to the third direction (the +Z direction) and orthogonal to the first and second directions. The positions in the first direction of the first and second probes 121 and 122 can be aligned thereby; therefore, the error es1 can be estimated with high accuracy.

In the shape measurement method according to the embodiment, the reference body A1 is spherical. Therefore, by simply disposing the reference body A1 between the first probe 121 and the second probe 122, any axis that passes through the center of the reference body A1 is parallel to the third direction. Also, not only the positions in the first direction of the first and second probes 121 and 122 but also the positions in the third direction of the first and second probes 121 and 122 can be aligned by using the spherical reference body A1.

The calibration measurement object A2 is a body of rotation that has the first direction as the longitudinal direction. Therefore, the surface shape along the longitudinal direction A34 of a long measurement object A3 can be measured with high accuracy.

The process of estimating the error $es1(x)$ includes a process of calculating the value $T2(x)$, which is one-half of the difference of the second measured value $y2(x)$, which is included in the second data D2 and is a value when the calibration measurement object A2 is at the first position (x) in the first direction, subtracted from the first measured value $y1(x)$, which is included in the first data D1 and is a value when the calibration measurement object A2 is at the first position (x) in the first direction. Thus, the error $es1(x)$ can be calculated by a simple method.

The process of correcting the third data D3 includes a process of subtracting the error $es1(x)$ from the third data D3. Therefore, the surface shape of the measurement object A3 can be measured with high accuracy.

The shape measuring device 100 according to the embodiment includes the calibration measurement object A2 that is rotationally symmetric around the axis A21, which is parallel to the first direction, the first probe 121 and the second probe 122 that are arranged in the second direction orthogonal to the first direction, the movement mechanism 112 that is configured to move the calibration measurement object A2 and the measurement object A3 relative to the first and second probes 121 and 122 in the first direction, and the controller 130 that controls the first probe 121, the second probe 122, and the movement mechanism 112.

In the state in which the calibration measurement object A2 is between the first probe 121 and the second probe 122, the controller 130 controls the first probe 121, the second probe 122, and the movement mechanism 112 and acquires the first data D1 of the change of the distance between the calibration measurement object A2 and the first probe 121 and the second data D2 of the change of the distance between the calibration measurement object A2 and the second probe 122 while moving the calibration measurement object A2 relative to the first and second probes 121 and 122 in the first direction.

The controller 130 estimates the error $es1(x)$ of the movement included in the first data D1 based on the first and second data D1 and D2.

In the state in which the measurement object A3 is between the first probe 121 and the second probe 122, the controller 130 controls the first probe 121 and the movement mechanism 112 and acquires the third data D3 of the change of the distance between the measurement object A3 and the first probe 121 while moving the measurement object A3 relative to the first probe 121 in the first direction.

The controller 130 corrects the third data D3 by using the error $es1(x)$.

According to such a shape measuring device 100, the surface shape of the measurement object A3 can be measured with high accuracy.

A method in which the stage 111 is moved in the +X direction is described in the first embodiment. However, the holder 125 that holds the first probe 121 and the second probe 122 may be moved in the +X direction without moving the stage 111.

Second Embodiment

A second embodiment will now be described.
Shape Measuring Device

Figure 26:
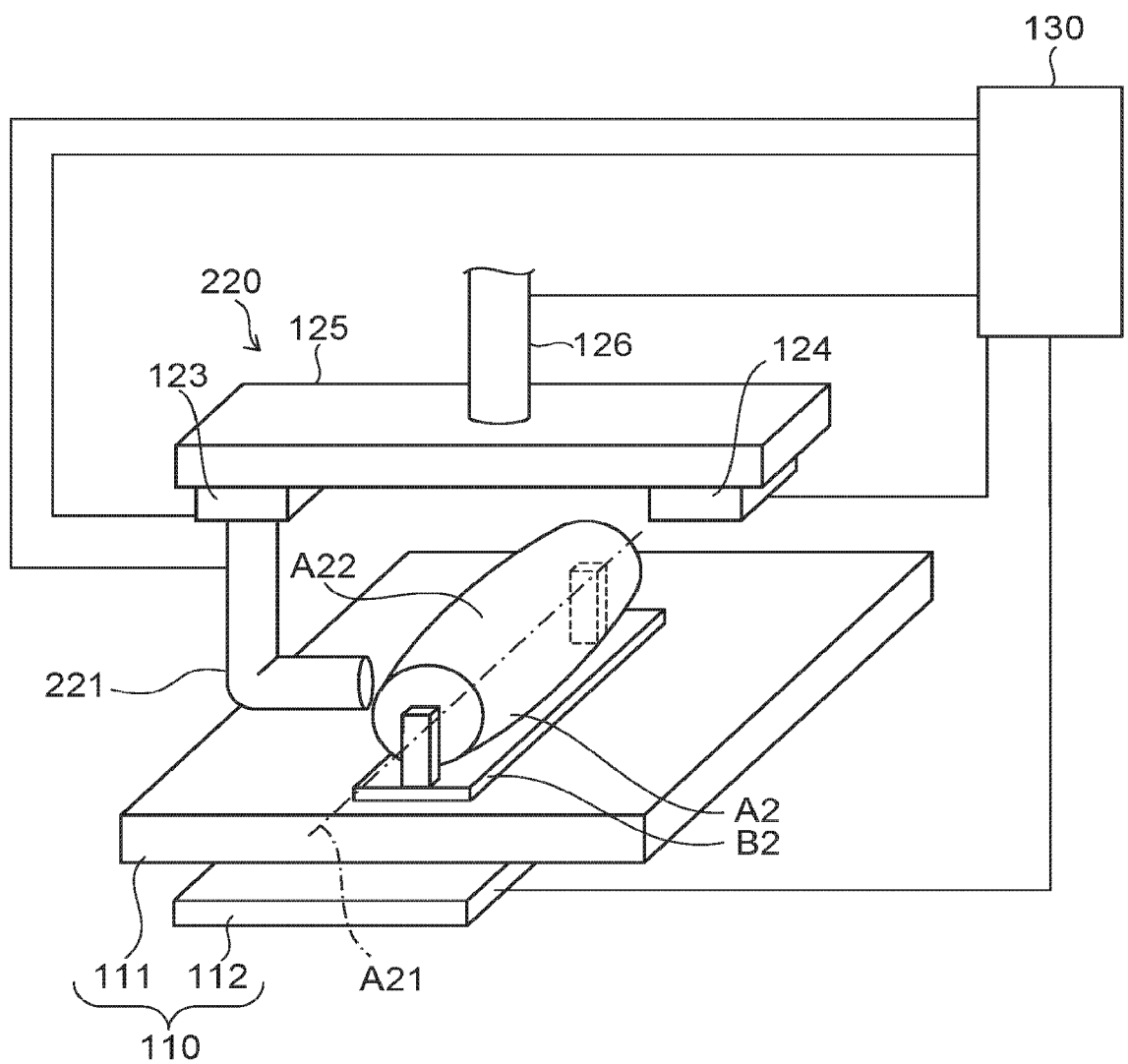
FIG. 26 is a perspective view showing a shape measuring device according to a second embodiment.
Figure 26:
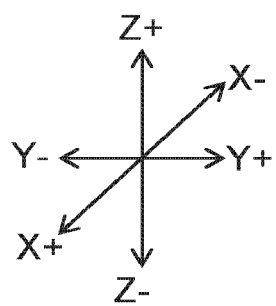

FIG. 26 is a perspective view showing a shape measuring device according to the embodiment.

The shape measuring device 200 according to the embodiment differs from the shape measuring device 100 according to the first embodiment in that the number of probes 221 is one. As a general rule in the following description, only the differences with the first embodiment are described. Otherwise, the items are similar to those of the first embodiment.

A measurement unit 220 includes one probe 221. In the embodiment, the probe 221 is configured to measure the distance from the object placed on the stage 111 without contact. Examples of such a probe include, for example, an optical probe such as a chromatic confocal probe, a laser focus probe, etc.

Figure 27:
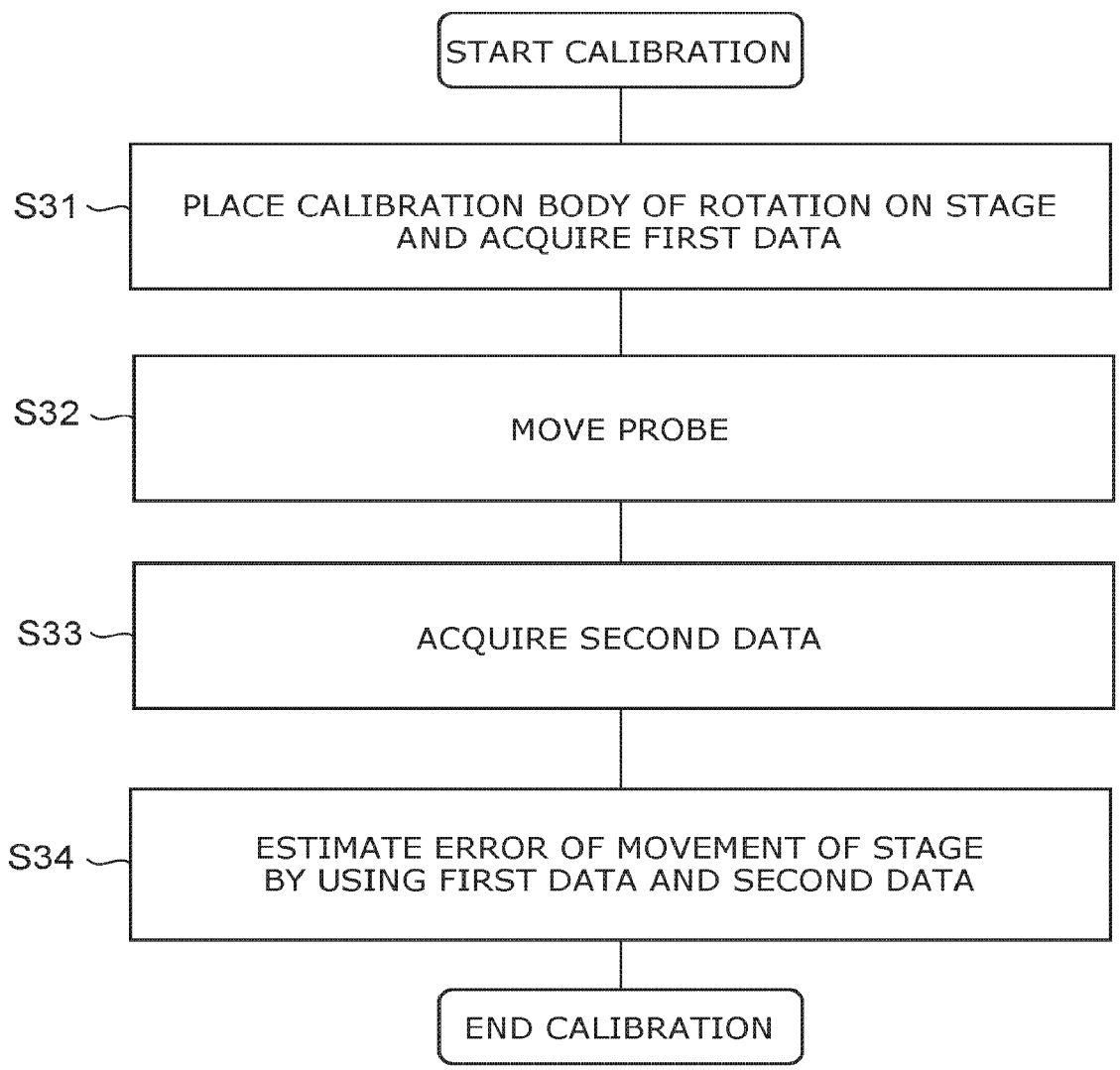
FIG. 27 is a flowchart showing a calibration method of a shape measurement method according to the second embodiment.

The probe 221 can be attached and detached to and from the first moving part 123 and the second moving part 124.
Calibration Method FIG. 27 is a flowchart showing a calibration method of a shape measurement method according to the embodiment.

Generally speaking, the calibration method of the embodiment includes a process (S31) of placing the calibration measurement object A2 on the stage 111 and acquiring the first data D1, a process (S32) of moving the probe 221, a process (S33) of acquiring the second data D2, and a process (S34) of estimating the error of the movement of the stage 111 by using the first data D1 and the second data D2. The processes will now be elaborated.

First, the process (S31) of placing the calibration measurement object A2 on the stage 111 and acquiring the first data D1 will be described.

Figure 28:
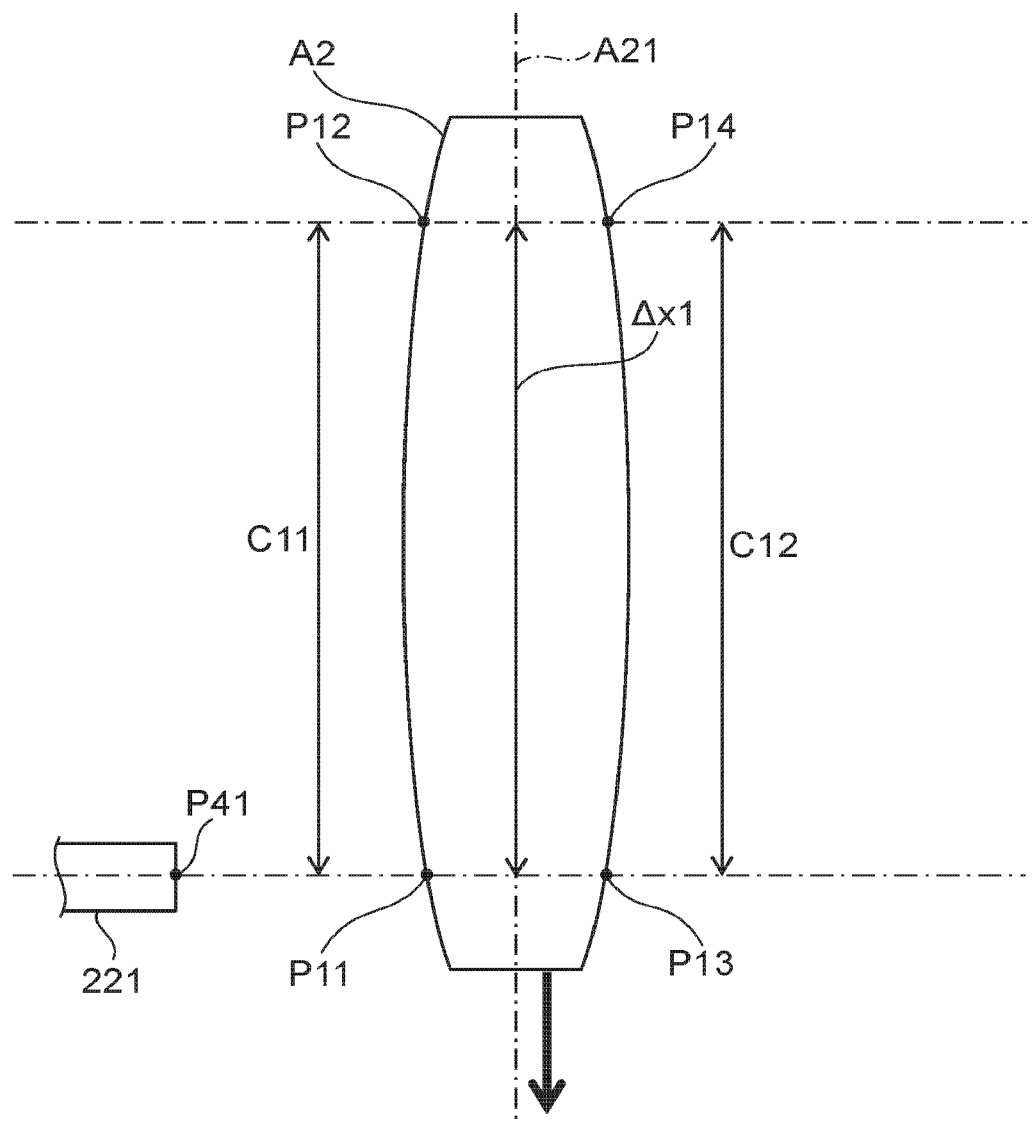
FIG. 28 is a top view showing a method for acquiring a first data in the calibration method.

FIG. 28 is a top view showing a method for acquiring the first data in the calibration method.

In the process (S31), the calibration measurement object A2 is placed on the stage 111 so that the axis A21 is parallel to the +X direction. The probe 221 is mounted to the first moving part 123 to face the +Y direction at a first position P41.

Then, the controller 130 controls the movement mechanism 112 and the probe 221 and acquires the first data D1 of the change of the distance between the probe 221 and the calibration measurement object A2 while moving the stage 111 in the +X direction from the initial position (x0). Thereby, the first range C11 of the surface of the calibration measurement object A2 is scanned by the probe 221.

Continuing, the controller 130 controls the movement mechanism 112 and returns the stage 111 to the initial position (x0) by moving the stage 111 in the −X direction.

The process (S32) of moving the probe 221 will now be described.

Figure 29:
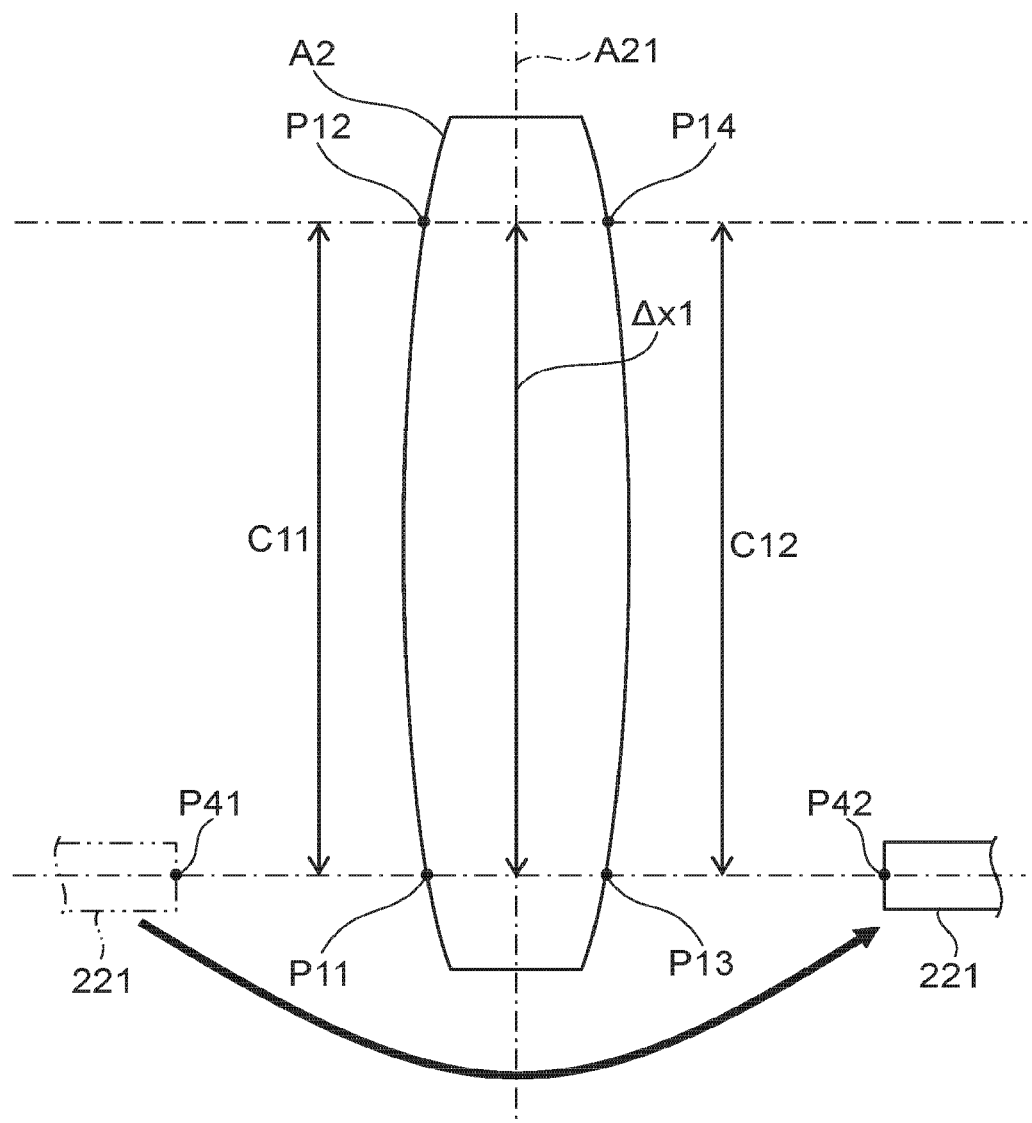
FIG. 29 is a top view showing a state in which a probe is moved from the state of FIG. 28.

FIG. 29 is a top view showing a state in which the probe is moved from the state of FIG. 28.

In the process (S32), first, the probe 221 is detached from the first moving part 123.

Then, the probe 221 is mounted to the second moving part 124 so that the probe 221 faces the −Y direction. Thereby, the probe 221 is moved from the first position P41 to a second position P42 that is at the opposite side so that the calibration measurement object A2 is interposed between the first position P41 and the second position P42. At this time, the probe 221 is located so that the position in the +X direction matches the position in the +X direction of the probe 221 when measuring the first data D1.

The process (S33) of acquiring the second data D2 will now be described.

The controller 130 controls the movement mechanism 112 and the probe 221 and acquires the second data D2 of the change of the distance between the probe 221 and the calibration measurement object A2 while moving the calibration measurement object A2 in the +X direction. Thereby, the second range C12 of the surface of the calibration measurement object A2 is scanned by the probe 221.

The process (S34) of estimating the error of the movement of the stage 111 by using the first data D1 and the second data D2 is similar to the process (S13) of the first embodiment, and a description is therefore omitted.

In the shape measurement method according to the embodiment as described above, the first data D1 of the change of the distance between the calibration measurement object A2 and the probe 221 is acquired while moving the calibration measurement object A2, which is rotationally symmetric around the axis A21 parallel to the first direction (the +X direction) relative to the probe 221 located at the first position P41 in the first direction. Then, the probe 221 is moved to the second position P42 that is at the side opposite to the first position P41 so that the calibration measurement object A2 is interposed between the first position P41 and the second position P42. Then, the second data D2 of the change of the distance between the calibration measurement object A2 and the probe 221 is acquired while moving the calibration measurement object A2 relative to the probe 221 in the first direction. Thus, the first data D1 and the second data D2 may be acquired by moving one probe 221.

Third Embodiment

A third embodiment will now be described.

Figure 30:
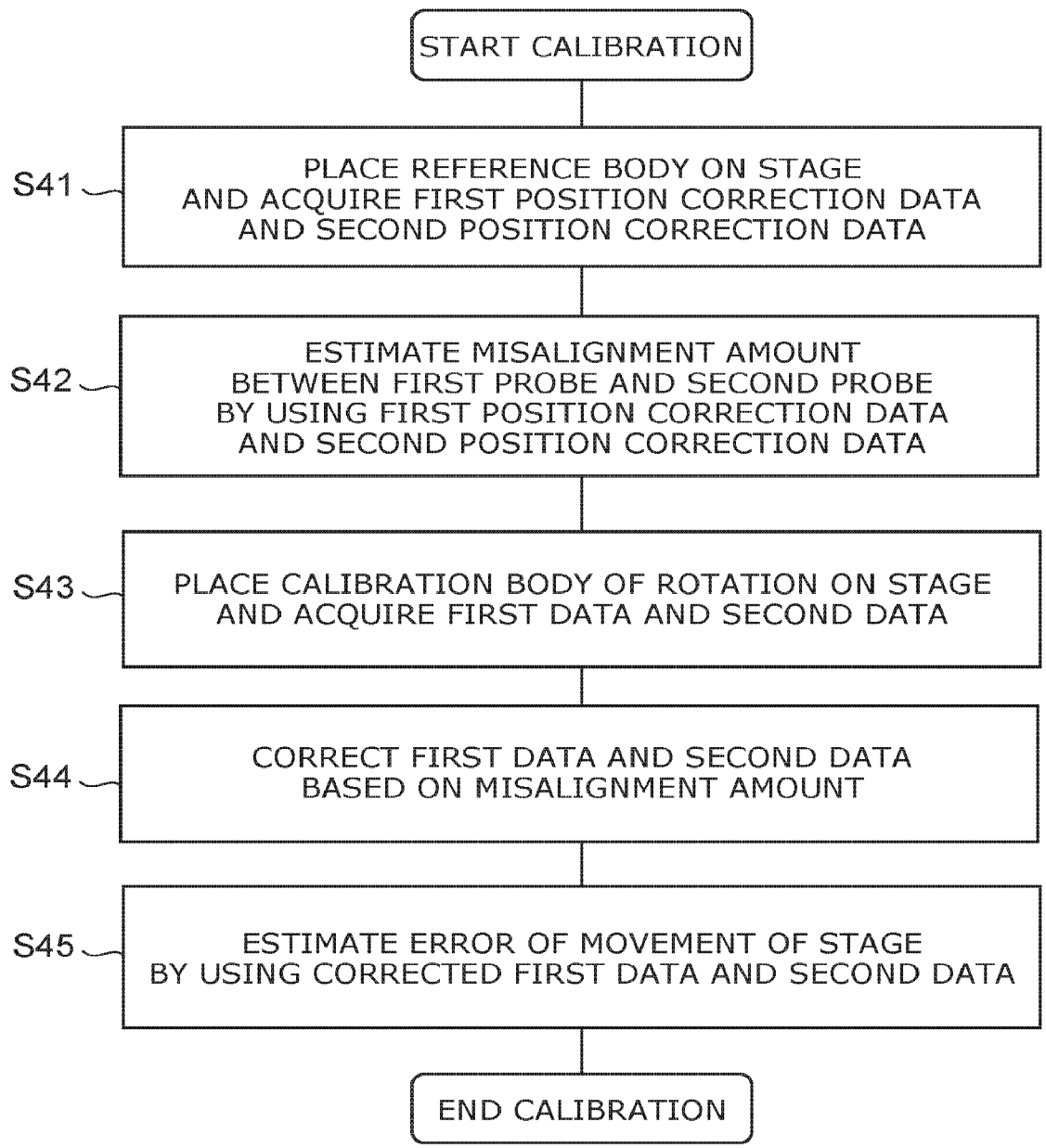
FIG. 30 is a flowchart showing a calibration method of a shape measurement method according to a third embodiment.

FIG. 30 is a flowchart showing a calibration method of a shape measurement method according to the embodiment.

The calibration method of the shape measurement method according to the embodiment differs from the shape measurement method according to the first embodiment in that the process (S11) of aligning the positions in the +X direction of the two probes 121 and 122 is not included.

Generally speaking, the calibration method of the embodiment includes a process (S41) of placing the reference body A1 on the stage and acquiring first position correction data J1 and second position correction data J2, a process (S42) of estimating a misalignment amount Δx between the first probe 121 and the second probe 122 by using the first position correction data J1 and the second position correction data J2, a process (S43) of placing the calibration measurement object A2 on the stage and acquiring the first data D1 and the second data D2, a process (S44) of correcting the first data D1 and the second data D2 based on the misalignment amount Δx, and a process (S45) of estimating the error es1($x$) of the movement of the stage 111 by using the corrected first data D1 and the corrected second data D2. The processes will now be elaborated.

First, the process (S41) of placing the reference body A1 on the stage and acquiring the first position correction data J1 and the second position correction data J2 will be described.

Figure 31:
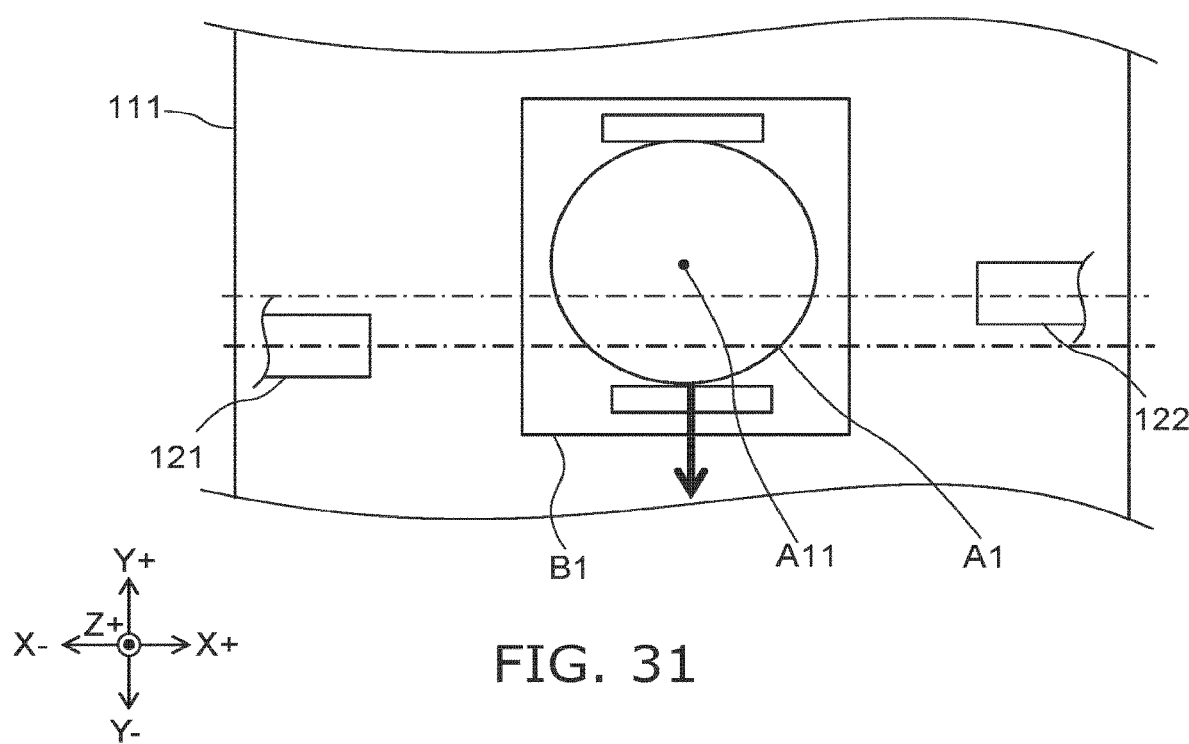
FIG. 31 is a top view showing a method for acquiring a first position correction data and a second position correction data in the calibration method.

FIG. 31 is a top view showing a method for acquiring the first position correction data and the second position correction data in the calibration method.

In a process S41, first, the reference body A1 is placed on the stage 111.

Then, the controller 130 controls the movement mechanism 112, the first probe 121, and the second probe 122 and acquires the first position correction data J1 of the change of the distance between the reference body A1 and the first probe 121 and the second position correction data J2 of the change of the distance between the reference body A1 and the second probe 122 while moving the stage 111 in the +X direction.

The process (S42) of estimating the misalignment amount Δx between the first probe 121 and the second probe 122 will now be described.

Figure 32:
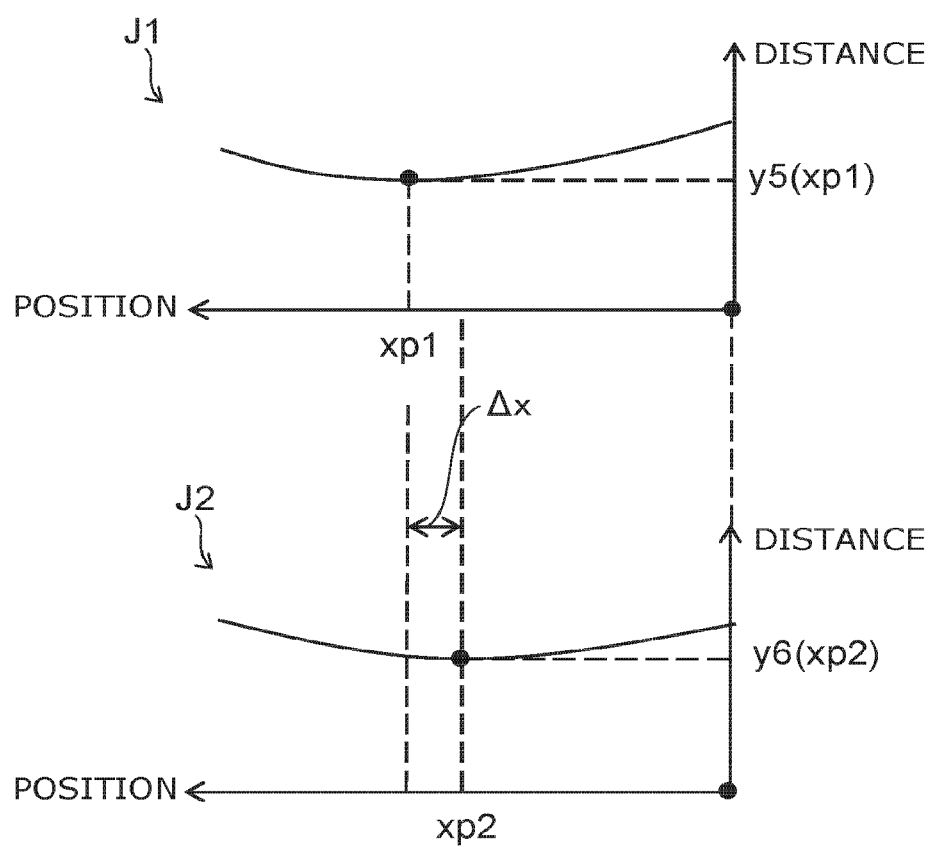
FIG. 32 is a conceptual view showing a method for estimating misalignment amounts of two probes by using the first position correction data and the second position correction data in the calibration method.

FIG. 32 is a conceptual view showing the method for estimating the misalignment amounts of the two probes by using the first position correction data and the second position correction data in the calibration method.

The first position correction data J1 is shown in a graph of FIG. 32 in which the horizontal axis is the position in the +X direction of the stage 111, and the vertical axis is the distance. The first position correction data J1 is data in which the measured value y5($x$) of the distance between the first probe 121 and the reference body A1 at each position (x) is associated with the multiple positions (x) in the +X direction of the stage 111.

Similarly, the second position correction data J2 is shown in a graph of FIG. 32 in which the horizontal axis is the position in the +X direction of the stage 111, and the vertical axis is the distance. The second position correction data J2 is data in which the measured value y6($x$) of the distance between the second probe 122 and the reference body A1 at each position (x) is associated with the multiple positions (x) in the +X direction of the stage 111.

In the process (S42), first, the controller 130 calculates the position (xp1) of the stage 111 in the +X direction to minimize the measured value y5($x$) of the distance between the first probe 121 and the reference body A1 in the first position correction data J1. Then, the controller 130 calculates the position (xp2) of the stage 111 in the +X direction to minimize the measured value y6($x$) of the distance between the second probe 122 and the reference body A1 in the second position correction data J2.

The controller 130 estimates the value at the position (xp2) subtracted from the value at the position (xp1) to be the relative misalignment amount Δx in the +X direction between the first probe 121 and the second probe 122. In other words, the misalignment amount Δx=xp1−xp2.

The process (S43) of placing the calibration measurement object A2 on the stage and acquiring the first data D1 and the second data D2 will now be described.

Figure 33:
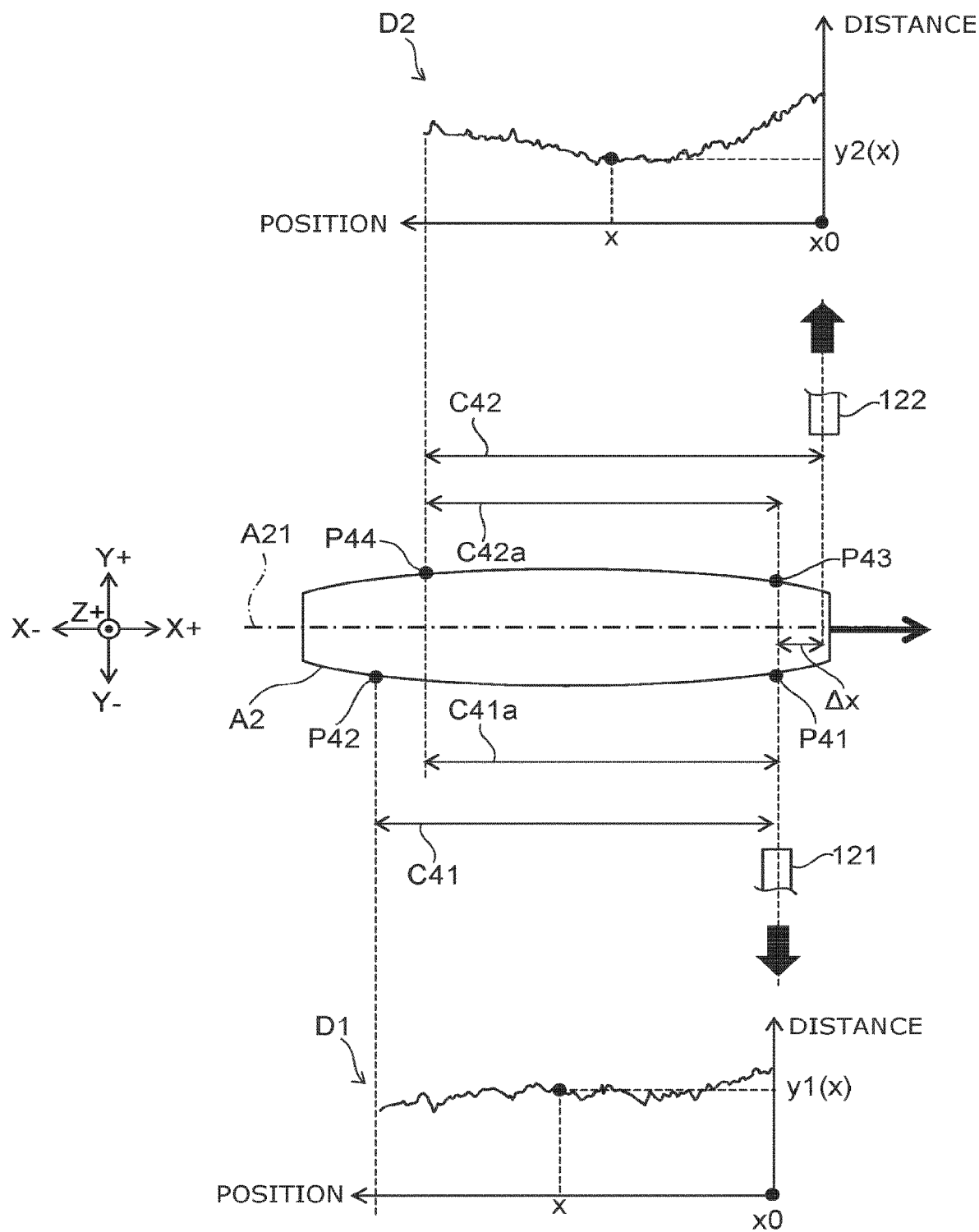
FIG. 33 is a conceptual view showing a method for acquiring a first data and a second data in the calibration method.

FIG. 33 is a conceptual view showing a method for acquiring the first data and the second data in the calibration method.

In the process (S43), first, the calibration measurement object A2 is placed on the stage 111 so that the axis A21 is parallel to the +X direction.

Then, the controller 130 controls the movement mechanism 112, the first probe 121, and the second probe 122 and acquires the first data D1 of the change of the distance between the calibration measurement object A2 and the first probe 121 and the second data D2 of the change of the distance between the calibration measurement object A2 and the second probe 122 by moving the stage 111 in the +X direction.

At this time, the position in the +X direction of the first probe 121 and the position in the +X direction of the second probe 122 are different by the amount of the misalignment amount Δx in the +X direction. Therefore, in the surface of the calibration measurement object A2, the position in the +X direction of a first range C41 scanned by the first probe 121 and the position in the +X direction of a second range C42 scanned by the second probe 122 are different by the amount of the misalignment amount Δx. Hereinbelow, the range in the +X direction of the first range C41 between the position of a start point P43 and the position of an end point 44 of the second range C42 is called a third range C41a. Similarly, the range in the +X direction of the second range C42 between the position of a start point P41 and the position of an end point 42 of the first range C41 is called a fourth range C42a.

The process (S44) of correcting the first data D1 and the second data D2 based on the misalignment amount Δx will now be described.

Figure 34:
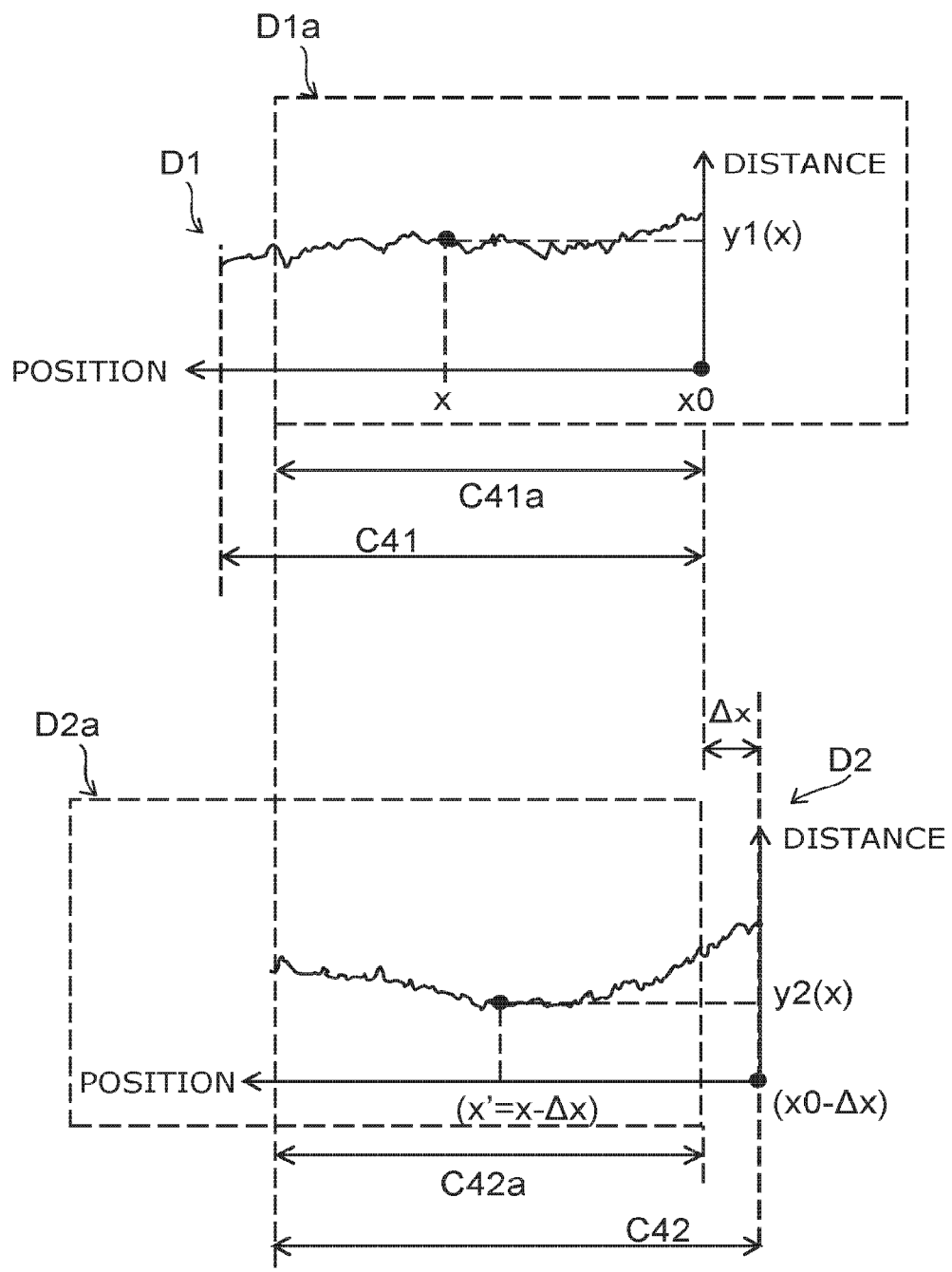
FIG. 34 is a conceptual view showing a method for correcting the first data and the second data based on the misalignment amount in the calibration method.

FIG. 34 is a conceptual view showing the method for correcting the first data and the second data based on the misalignment amount in the calibration method.

First, the controller 130 calculates a position (x') after the correction by subtracting the misalignment amount Δx from each position (x) in the +X direction of the second data D2. Then, the controller 130 extracts, for the first data D1, the first measured value y1(x) for which the position (x) in the +X direction is within the range of the start point and the end point of the position (x') after the correction in the +X direction of the second data D2. Similarly, the controller 130 extracts, for the second data D2, the second measured value y2(x) for which the position (x') after the correction in the +X direction is within the range of the start point and the end point of the position (x) in the +X direction of the first data D1.

Hereinbelow, data D1a in which the extracted first measured value y1(x) is associated with the multiple positions (x) in the +X direction is called the "first extraction data D1a". The first extraction data D1a corresponds to the first data D1 after the correction. Similarly, data D2a in which the extracted second measured value y2(x) is associated with the multiple positions (x') after the correction in the +X direction is called the "second extraction data D2a". The second extraction data D2a corresponds to the second data D2 after the correction.

The multiple positions (x) in the +X direction in the first extraction data D1a correspond to the multiple positions (x) in the +X direction of the third range C41a of the first surface A31. The multiple positions (x') after the correction of the +X direction in the second extraction data D2a correspond to the multiple positions (x) in the +X direction of the fourth range C42a of the second surface A32.

The process (S45) of estimating the error es1(x) of the movement of the stage 111 will now be described.

Figure 35:
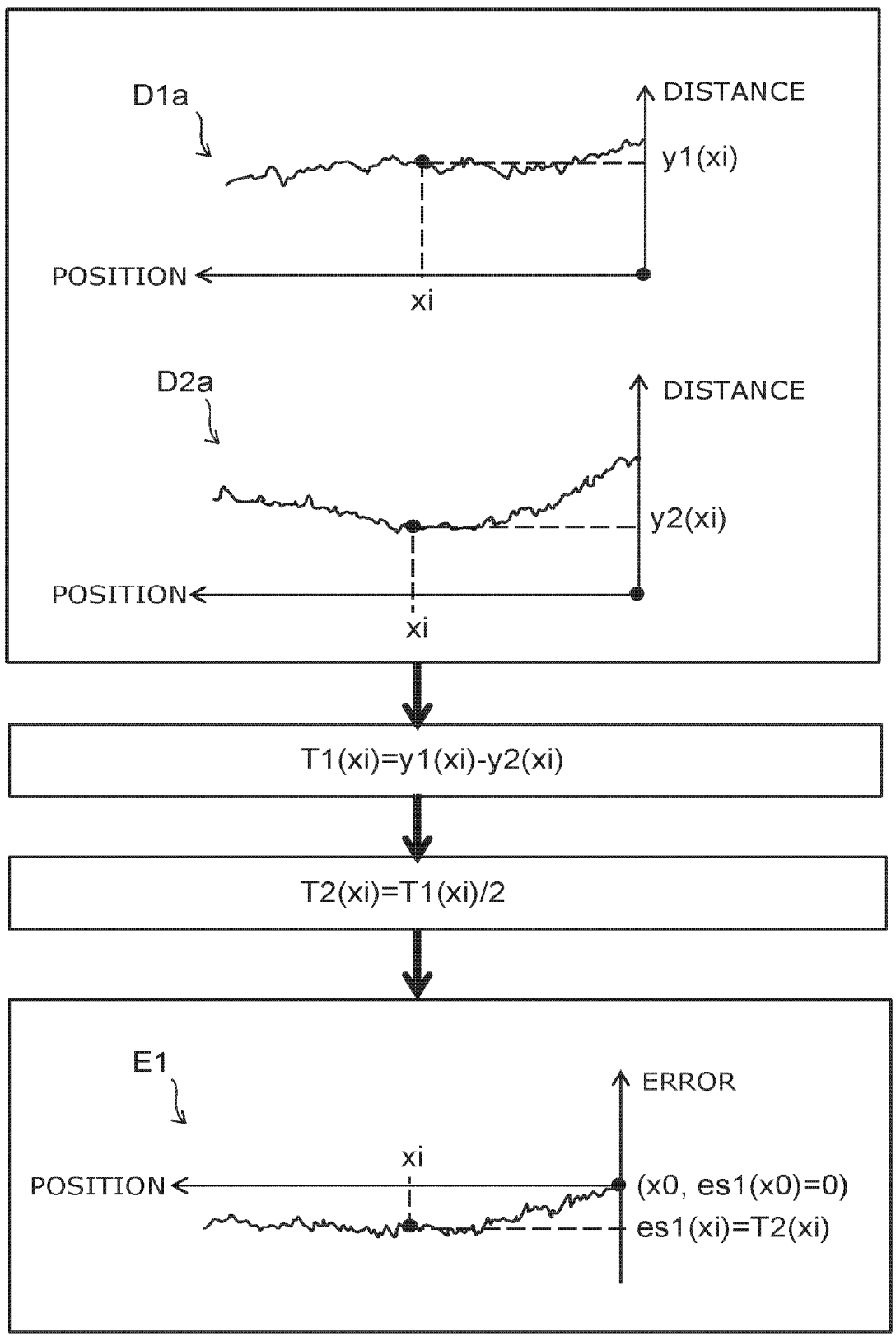
FIG. 35 is a conceptual view showing a method for estimating an error of a movement of a stage in the calibration method.

FIG. 35 is a conceptual view showing the method for estimating the error of the movement of the stage in the calibration method.

The controller 130 calculates the value T1(xi) by subtracting the second measured value y2(xi) at the position (xi) in the +X direction of the second extraction data D2a from the first measured value y1(xi) at the position (xi) in the +X direction of the first extraction data D1a. In other words, T1(xi)=y1(xi)−y2(xi). Then, the controller 130 calculates the value T2(xi), which is one-half of the value T1(xi). In other words, T2(xi)=T1(xi)/2. Then, the controller 130 estimates the value T2(xi) to be the error es1(xi) of the movement of the stage 111 at the position (xi). The controller 130 performs the processing described above for all positions (x) in the +X direction of the first extraction data D1a.

Thereby, the first error data E1 is generated in which the error es1(x) of the movement of the stage 111 at each position (x) is associated with the multiple positions (x) in the +X direction of the stage 111.

As described above, before the process of estimating the error es1(x), the shape measurement method according to the embodiment acquires the first position correction data J1 of the change of the distance between the reference body A1 and the first probe 121 and the second position correction data J2 of the change of the distance between the reference body A1 and the second probe 122 while moving the reference body A1, which is rotationally symmetric around the axis A11 parallel to the third direction and orthogonal to the first and second directions relative to the first and second probes 121 and 122 in the first direction between the first probe 121 and the second probe 122. Then, the relative misalignment amount Δx between the position in the first direction of the first probe and the position in the first direction of the second probe is estimated based on the first position correction data J1 and the second position correction data J2. Then, the first data D1 and the second data D2 are corrected based on the misalignment amount Δx.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Additionally, the embodiments described above can be combined mutually.

What is claimed is:

1. A shape measurement method, comprising:
acquiring first data of a change of a distance between a first probe and a calibration measurement object and acquiring second data of a change of a distance between a second probe and the calibration measurement object while moving the calibration measurement object relative to the first and second probes in a first direction between the first probe and the second probe, the calibration measurement object being rotationally symmetric around an axis parallel to the first direction, the first probe and the second probe being arranged in a second direction orthogonal to the first direction;
acquiring first position correction data of a change of a distance between the first probe and a reference body and acquiring second position correction data of a change of a distance between the second probe and the reference body while moving the reference body relative to the first and second probes in the first direction between the first probe and the second probe, the reference body being rotationally symmetric around an axis parallel to a third direction, the third direction being orthogonal to the first and second directions;
estimating a relative misalignment amount between a position in the first direction of the first probe and a position in the first direction of the second probe based on the first position correction data and the second position correction data;
correcting the first data and the second data based on the misalignment amount;
estimating an error of the movement included in the first data based on the first and second data;

acquiring third data of a change of a distance between the first probe and a measurement object while moving the measurement object relative to the first probe in the first direction; and correcting the third data by using the error.

2. A shape measurement method, comprising:

acquiring first data of a change of a distance between a first probe and a calibration measurement object and acquiring second data of a change of a distance between a second probe and the calibration measurement object while moving the calibration measurement object relative to the first and second probes in a first direction between the first probe and the second probe, the calibration measurement object being rotationally symmetric around an axis parallel to the first direction, the first probe and the second probe being arranged in a second direction orthogonal to the first direction;

moving the first probe to a position in the first direction to minimize a distance between the first probe and a spherical reference body, and moving the second probe to a position in the first direction to minimize a distance between the second probe and the reference body, the reference body being rotationally symmetric around an axis parallel to a third direction, the third direction being orthogonal to the first and second directions;

estimating an error of the movement included in the first data based on the first and second data;

acquiring third data of a change of a distance between the first probe and a measurement object while moving the measurement object relative to the first probe in the first direction; and correcting the third data by using the error.

3. The method according to claim 1, wherein the calibration measurement object is a body of rotation having the first direction as a longitudinal direction.

4. The method according to claim 1, wherein the estimating of the error includes calculating one-half of a difference of a second measured value subtracted from a first measured value, the first measured value is included in the first data and is a value when the calibration measurement object is at a first position in the first direction, and the second measured value is included in the second data and is a value when the calibration measurement object is at the first position in the first direction.

5. The method according to claim 1, wherein the correcting of the third data includes subtracting the error from the third data.

6. A shape measurement method, comprising:

acquiring first data of a change of a distance between a probe and a calibration measurement object while moving the calibration measurement object relative to the probe in a first direction, the calibration measurement object being rotationally symmetric around an axis parallel to the first direction, the probe being located at a first position;

moving the probe to a second position at a side opposite to the first position, the calibration measurement object being interposed between the first position and the second position;

acquiring second data of a change of a distance between the probe and the calibration measurement object while moving the calibration measurement object relative to the probe in the first direction;

acquiring first position correction data of a change of a distance between the first probe and a reference body and acquiring second position correction data of a change of a distance between the second probe and the reference body while moving the reference body relative to the first and second probes in the first direction between the first probe and the second probe, the reference body being rotationally symmetric around an axis parallel to a third direction, the third direction being orthogonal to the first and second directions;

estimating a relative misalignment amount between a position in the first direction of the first probe and a position in the first direction of the second probe based on the first position correction data and the second position correction data;

correcting the first data and the second data based on the misalignment amount;

estimating an error of the movement included in the first data based on the first and second data;

acquiring third data of a change of a distance between the probe and a measurement object while moving the measurement object relative to the probe in the first direction; and correcting the third data by using the error.

7. A shape measuring device, comprising:

a calibration measurement object rotationally symmetric around an axis parallel to a first direction;

a first probe and a second probe arranged in a second direction orthogonal to the first direction;

a movement mechanism configured to move the calibration measurement object relative to the first and second probes in the first direction and configured to move a measurement object relative to the first and second probes in the first direction; and a controller controlling the first probe, the second probe, and the movement mechanism, the controller acquiring first data of a change of a distance between the first probe and the calibration measurement object and acquiring second data of a change of a distance between the second probe and the calibration measurement object while moving the calibration measurement object relative to the first and second probes in the first direction by controlling the first probe, the second probe, and the movement mechanism in a state in which the calibration measurement object is between the first probe and the second probe, acquiring first position correction data of a change of a distance between the first probe and a reference body and acquiring second position correction data of a change of a distance between the second probe and the reference body while moving the reference body relative to the first and second probes in the first direction between the first probe and the second probe, the reference body being rotationally symmetric around an axis parallel to a third direction, the third direction being orthogonal to the first and second directions;

estimating a relative misalignment amount between a position in the first direction of the first probe and a position in the first direction of the second probe based on the first position correction data and the second position correction data;

correcting the first data and the second data based on the misalignment amount;

estimating an error of the movement included in the first data based on the first and second data, acquiring third data of a change of a distance between the first probe and the measurement object while moving the measurement object relative to the first probe in the first direction by controlling the first probe and the movement mechanism in a state in which the measurement object is between the first probe and the second probe, and correcting the third data by using the error.

* * * * *